(12) United States Patent
Knoll et al.

(10) Patent No.: US 11,370,536 B2
(45) Date of Patent: Jun. 28, 2022

(54) TIP GAP CONTROL SYSTEMS WITH ACTIVE BLADE TIPS

(71) Applicant: Textron Innovations Inc., Providence, RI (US)

(72) Inventors: Jonathan Andrew Knoll, Burleson, TX (US); George Matthew Thompson, Lewisville, TX (US); Nicholas Ralph Carlson, Dallas, TX (US)

(73) Assignee: Textron Innovations Inc., Providence, RI (US)

( * ) Notice: Subject to any disclaimer, the term of this patent is extended or adjusted under 35 U.S.C. 154(b) by 188 days.

(21) Appl. No.: 16/907,071

(22) Filed: Jun. 19, 2020

(65) Prior Publication Data

US 2021/0396247 A1 Dec. 23, 2021

(51) Int. Cl.
| *F04D 29/52* | (2006.01) |
| *B64C 29/00* | (2006.01) |
| *B64C 11/00* | (2006.01) |
| *B64C 27/46* | (2006.01) |
| *B64C 27/72* | (2006.01) |

(52) U.S. Cl.
CPC ........ *B64C 29/0033* (2013.01); *B64C 11/001* (2013.01); *B64C 27/463* (2013.01); *B64C 27/72* (2013.01); *F05D 2220/328* (2013.01); *F05D 2240/307* (2013.01)

(58) Field of Classification Search
CPC ..... B64C 11/001; B64C 27/463; B64C 27/72; F05D 2240/307
See application file for complete search history.

(56) References Cited

U.S. PATENT DOCUMENTS

| 7,464 | A |  | 6/1850 | Timby |
| 3,117,716 | A | * | 1/1964 | Wernicke ............... F01D 11/12 |
|  |  |  |  | 415/173.1 |
| 3,814,351 | A |  | 6/1974 | Bielawa |
| 5,277,380 | A |  | 1/1994 | Cycon et al. |
| 5,566,907 | A |  | 10/1996 | Marze et al. |
| 6,966,755 | B2 | * | 11/2005 | Garner .................... F01D 11/16 |
|  |  |  |  | 416/107 |
| 7,004,427 | B2 |  | 2/2006 | Gerbino |
| 7,874,513 | B1 | * | 1/2011 | Smith .................. B64C 11/001 |
|  |  |  |  | 244/12.4 |
| 8,636,246 | B2 |  | 1/2014 | Robertson et al. |
| 8,640,984 | B2 |  | 2/2014 | Kebrle et al. |

(Continued)

FOREIGN PATENT DOCUMENTS

EP        2703605 A2    3/2014

*Primary Examiner* — Christopher D Hutchens
(74) *Attorney, Agent, or Firm* — Lawrence Youst PLLC

(57) ABSTRACT

A tip gap control system for a ducted aircraft includes a flight control computer including a blade length control module configured to generate a blade tip actuator command and a proprotor system in data communication with the flight control computer. The proprotor system includes a duct and proprotor blades surrounded by the duct. Each of the proprotor blades includes an active blade tip movable into various positions including a retracted position and an extended position. The tip gap control system also includes one or more actuators coupled to the active blade tips. The one or more actuators move the active blade tips between the various positions based on the blade tip actuator command, thereby controlling a tip gap between the proprotor blades and the duct.

20 Claims, 23 Drawing Sheets

(56) References Cited

U.S. PATENT DOCUMENTS

| | | | |
|---|---|---|---|
| 9,592,910 B1* | 3/2017 | Beckman | B64C 27/463 |
| 9,809,304 B1 | 11/2017 | Beckman et al. | |
| 10,106,253 B2 | 10/2018 | Groninga et al. | |
| 11,168,702 B2 | 11/2021 | Roberge | |
| 2007/0272796 A1* | 11/2007 | Stuhr | B64D 27/12 |
| | | | 244/54 |
| 2009/0269189 A1* | 10/2009 | Bottome | F04D 29/164 |
| | | | 415/121.2 |
| 2016/0075430 A1* | 3/2016 | Foskey | B64C 27/463 |
| | | | 416/1 |
| 2016/0319845 A1* | 11/2016 | Molnar | F04D 29/324 |
| 2018/0362160 A1 | 12/2018 | Groninga et al. | |
| 2019/0072106 A1 | 3/2019 | Husband et al. | |
| 2020/0025019 A1* | 1/2020 | Feulner | F01D 11/24 |
| 2020/0089227 A1 | 3/2020 | LeGrand et al. | |
| 2020/0102852 A1 | 4/2020 | Jain et al. | |
| 2020/0115036 A1 | 4/2020 | Vaughn et al. | |
| 2020/0116043 A1* | 4/2020 | Jain | F01D 21/045 |

* cited by examiner

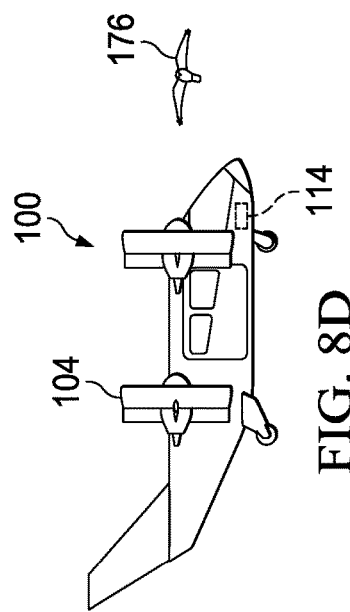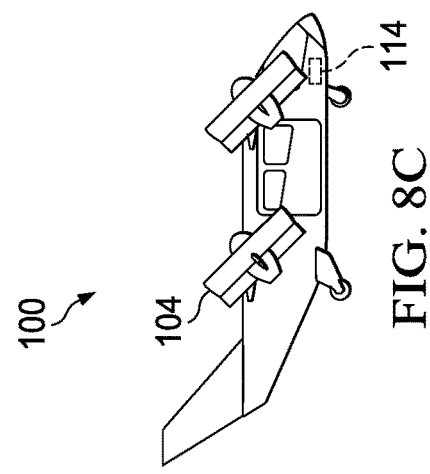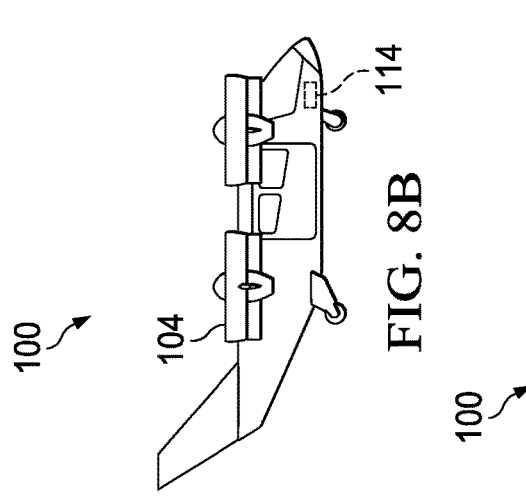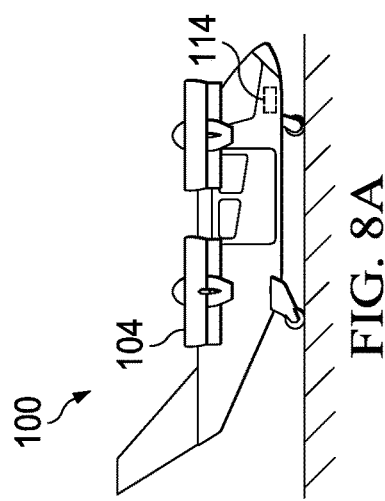

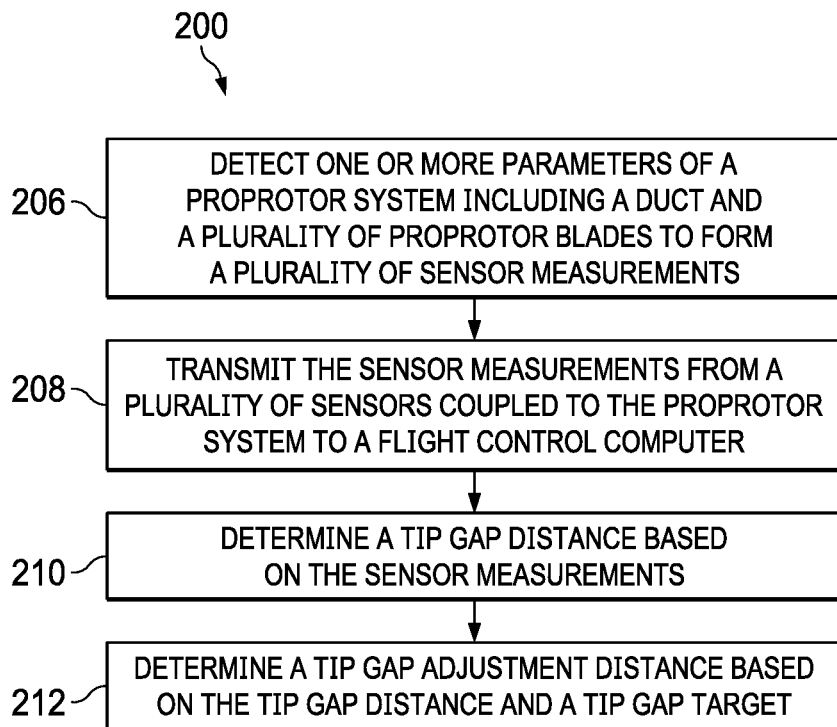
FIG. 9A
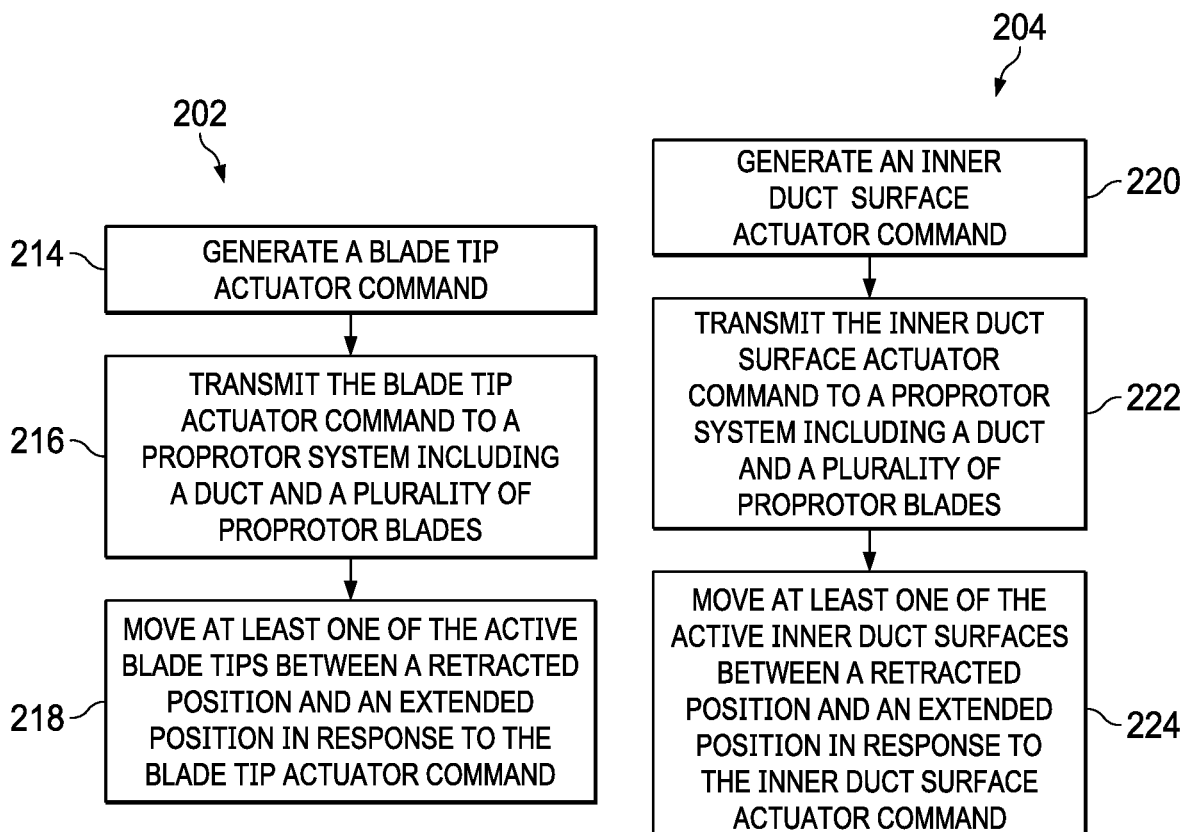
FIG. 9B
FIG. 9C

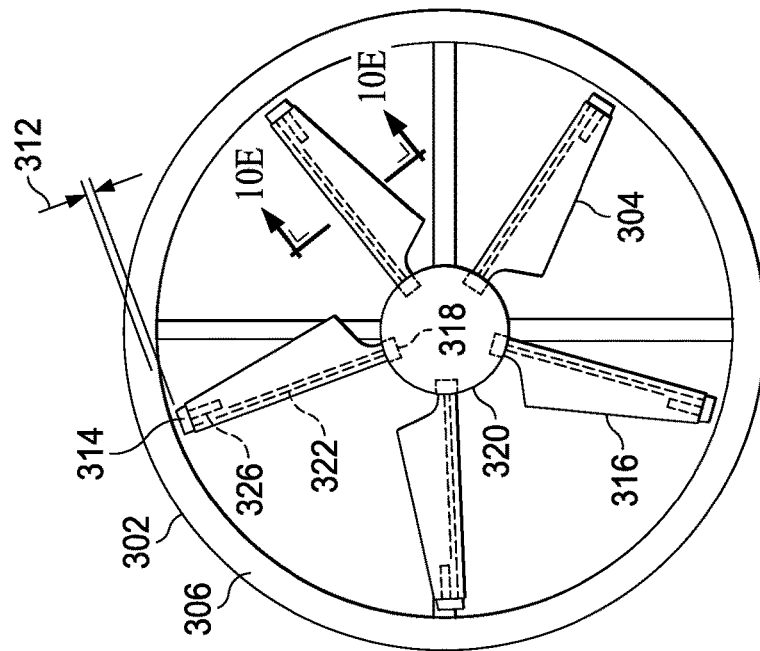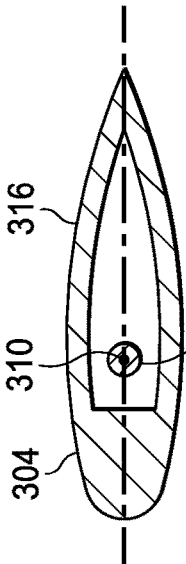
FIG. 10D
FIG. 10E
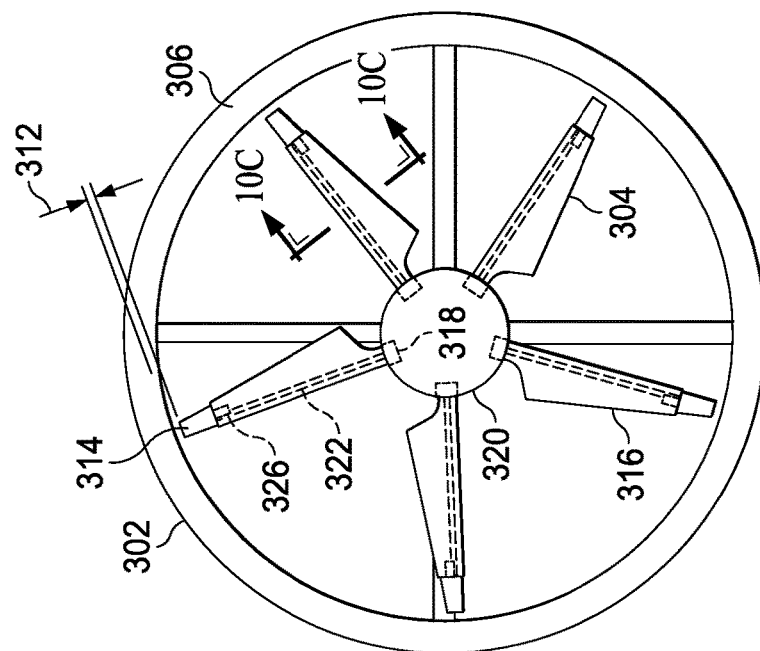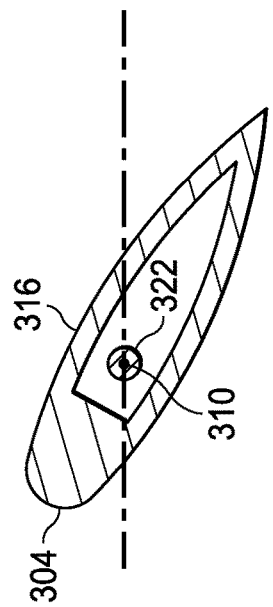
FIG. 10B
FIG. 10C

TIP GAP CONTROL SYSTEMS WITH ACTIVE BLADE TIPS

TECHNICAL FIELD OF THE DISCLOSURE

The present disclosure relates, in general, to aircraft having ducted rotor systems and, in particular, to tip gap monitoring and control systems that actively, semi-actively or passively manage the tip gap between the rotor blades and duct of a ducted rotor system.

BACKGROUND

Ducted rotor systems offer several benefits over open rotor systems in which the rotor blades are exposed. For example, ducted rotor systems emit less noise and are therefore preferred when a reduced noise environment is desired, such as during air reconnaissance, clandestine operations or flight in urban airspace. Ducts increase safety for ground personnel and crew by preventing contact with an operating rotor. Openly exposed rotors can lead to blade tip thrust losses during flight. By reducing rotor blade tip losses, a ducted rotor system is more efficient in producing thrust than an open rotor system of similar diameter, especially at low speed and high static thrust levels. Also, the thrust vectoring capabilities of open rotor systems are limited as is the use of pressure differentials to augment thrust.

The performance of a ducted rotor system is sensitive to the tip gap between the blade tips and the duct. Ducted rotor systems are designed to have a minimum tip gap throughout the flight envelope to maximize duct performance. For example, ducted rotor systems are most efficient in hover when the tip gap is as small as possible. Conversely, the tip gap must be large enough to avoid collisions between the rotor blades and the duct during operation. Furthermore, the tip gap of a ducted rotor system changes during flight as the duct, rotor blades or stators deform or deflect under load in response to flight conditions. For example, on tiltrotor aircraft utilizing ducted proprotor systems, the ducted proprotor systems experience high loads in the transition between the vertical takeoff and landing flight mode and the forward flight mode. These high transition loads can deform the duct, proprotor blades, stators or other parts of the ducted proprotor system, which affects the tip gap. Unexpected collisions with ducted rotor systems during flight, such as bird strikes, also affect the tip gap. Current ducted aircraft are unable to monitor, manage and control the changing tip gap of their ducted rotors, which necessitates shortening the rotor blades more than necessary to prevent collisions between the rotor blades and duct, which in turn leads to performance degradation. Accordingly, a need has arisen for tip gap monitoring and control systems that actively, semi-actively or passively enable the rotor blades of a ducted rotor system to be as close as possible to the duct while mitigating the risk of collision between the rotor blades and the duct.

SUMMARY

In a first aspect, the present disclosure is directed to a tip gap control system for a ducted aircraft. The tip gap control system includes a flight control computer including a blade length control module configured to generate a blade tip actuator command and a proprotor system in data communication with the flight control computer. The proprotor system includes a duct and proprotor blades surrounded by the duct. Each of the proprotor blades includes an active blade tip movable into various positions including a retracted position and an extended position. The tip gap control system also includes one or more actuators coupled to the active blade tips. The one or more actuators move the active blade tips between the various positions based on the blade tip actuator command, thereby controlling a tip gap between the proprotor blades and the duct.

In some embodiments, the blade tip actuator command may include a tip gap adjustment distance, the one or more actuators configured to move the active blade tips by the tip gap adjustment distance. In certain embodiments, the blade tip actuator command may include one or more blade-specific blade tip actuator commands, each of the blade-specific blade tip actuator commands corresponding to a respective one of the active blade tips. In some embodiments, the blade tip actuator command may include one of a retract or an extend command, the one or more actuators configured to move the active blade tips by a predetermined distance in response to receiving the blade tip actuator command. In certain embodiments, each of the proprotor blades may include a main body having an open distal end, the active blade tips slidably coupled to the open distal ends of the main bodies of the proprotor blades. In such embodiments, the active blade tips may be at least partially retracted into the main bodies of the proprotor blades in the retracted position and at least partially extended from the open distal ends of the main bodies of the proprotor blades in the extended position, thereby increasing the tip gap in the retracted position.

In some embodiments, each of the proprotor blades may include a main body having a distal end, the active blade tips hingeably coupled to the distal ends of the main bodies of the proprotor blades. In such embodiments, the active blade tips may be substantially coplanar with the main bodies of the proprotor blades in the extended position and form an angle of less than 180 degrees with the main bodies of the proprotor blades in the retracted position, thereby increasing the tip gap in the retracted position. In certain embodiments, each proprotor blade may include a spring biasing a respective active blade tip in the retracted position or the extended position. In some embodiments, the active blade tips may be independently actuated to permit nonuniform positioning of the active blade tips. In certain embodiments, the proprotor system may include a proprotor hub, the one or more actuators disposed at the proprotor hub. In such embodiments, the one or more actuators may be coupled to the active blade tips by a plurality of spanwise links. In some embodiments, one or more actuators may be disposed at distal ends of the proprotor blades, each actuator coupled to a respective one of the active blade tips.

In a second aspect, the present disclosure is directed to a rotorcraft including a fuselage, a flight control computer including a blade length control module configured to generate a blade tip actuator command and a proprotor system coupled to the fuselage and in data communication with the flight control computer. The proprotor system includes a duct and proprotor blades surrounded by the duct. Each of the proprotor blades includes an active blade tip movable into various positions including a retracted position and an extended position. The proprotor system also includes one or more actuators coupled to the active blade tips. The one or more actuators move the active blade tips between various positions based on the blade tip actuator command, thereby controlling a tip gap between the proprotor blades and the duct.

In some embodiments, the rotorcraft may include a maneuver detection module configured to detect a flight condition of the rotorcraft such as a flight maneuver or a flight mode, the blade length control module configured to determine the blade tip actuator command based on the flight condition.

In a third aspect, the present disclosure is directed to a method for controlling a tip gap for a ducted aircraft including generating a blade tip actuator command; transmitting the blade tip actuator command to a proprotor system including a duct and proprotor blades, the proprotor blades including active blade tips; and moving at least one of the active blade tips between a retracted position and an extended position in response to the blade tip actuator command, thereby controlling the tip gap between the proprotor blades and the duct.

In some embodiments, the method may include generating the blade tip actuator command in response to receiving a tip gap adjustment distance. In certain embodiments, the method may include generating the blade tip actuator command in response to the tip gap adjustment distance exceeding a tip gap adjustment distance threshold. In some embodiments, the method may include generating the blade tip actuator command based on a pitch of the proprotor blades. In certain embodiments, the ducted aircraft may be convertible between a vertical takeoff and landing flight mode and a forward flight mode. In such embodiments, the method may include moving the active blade tips between the retracted position and the extended position in response to the ducted aircraft converting between the vertical takeoff and landing flight mode and the forward flight mode. In some embodiments, the method may include retracting the active blade tips in response to detecting a structural deformity of the proprotor system. In certain embodiments, the method may include retracting the active blade tips in response to detecting a collision with the proprotor system. In some embodiments, the method may include moving the active blade tips such that the tip gap is substantially equal to a tip gap target.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 8A-8H are schematic illustrations of a ducted aircraft having a tip gap monitoring and control system in a sequential flight operating scenario in accordance with embodiments of the present disclosure;

FIGS. 9A-9C are flowcharts of various methods for monitoring and controlling the tip gap for a ducted aircraft in accordance with embodiments of the present disclosure;

FIGS. 10A-10E are various views of a passive tip gap control system for a ducted aircraft utilizing blade tip extensions in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1B:
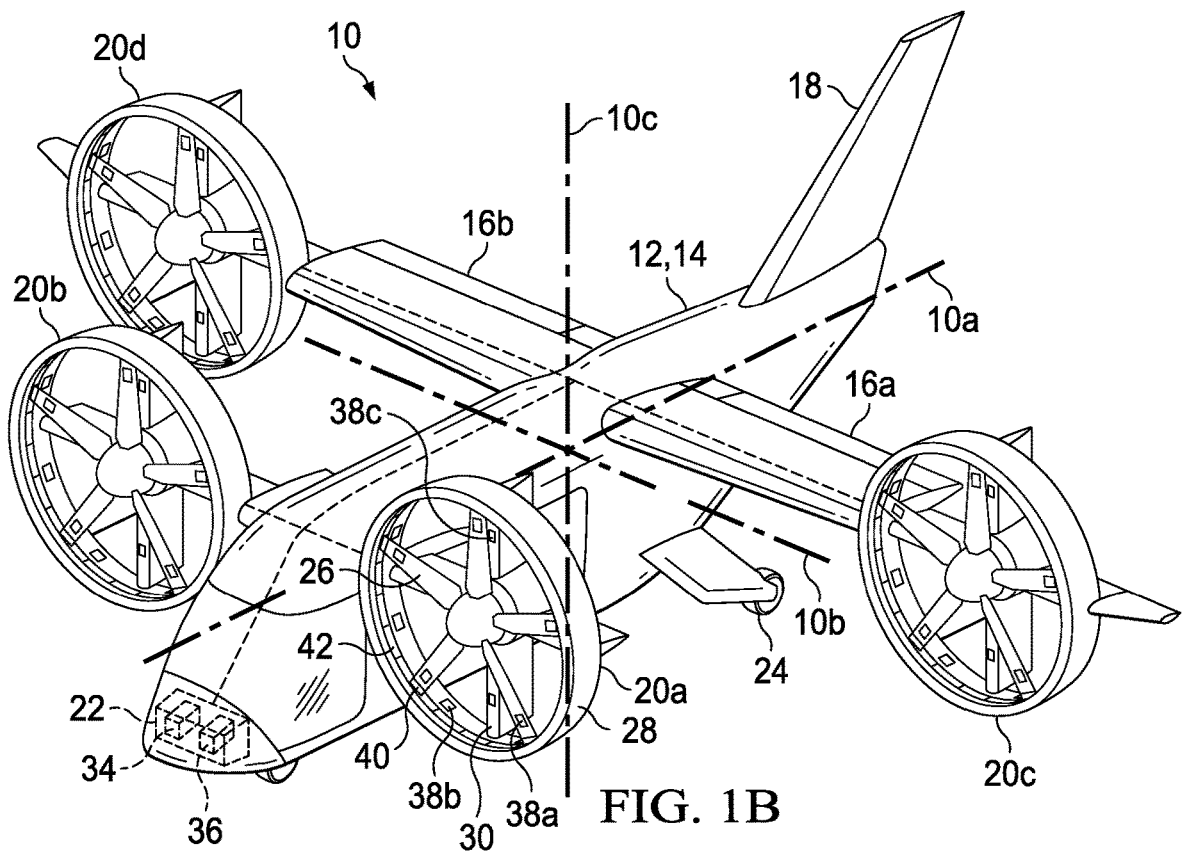
FIGS. 1A-1F are schematic illustrations of a ducted aircraft having a tip gap monitoring and control system in accordance with embodiments of the present disclosure.
Figure 1A:
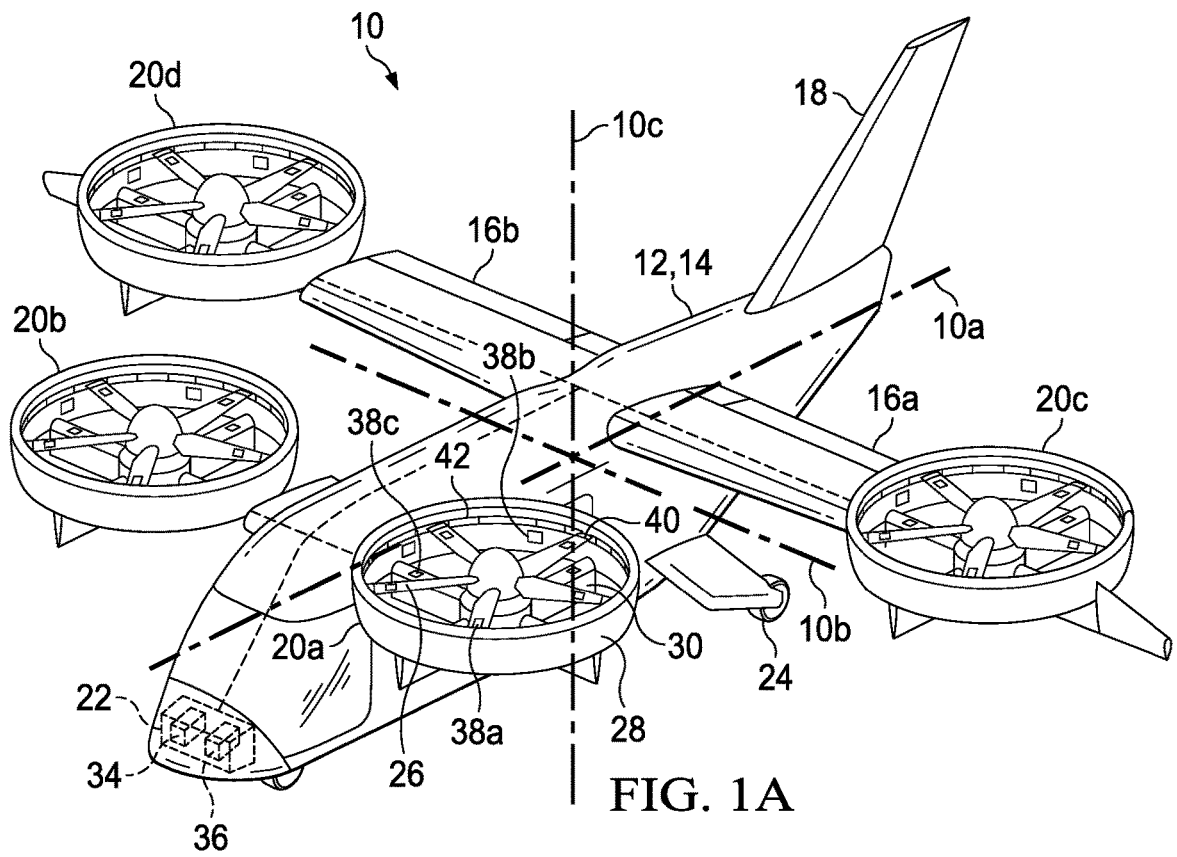
Figure 1D:
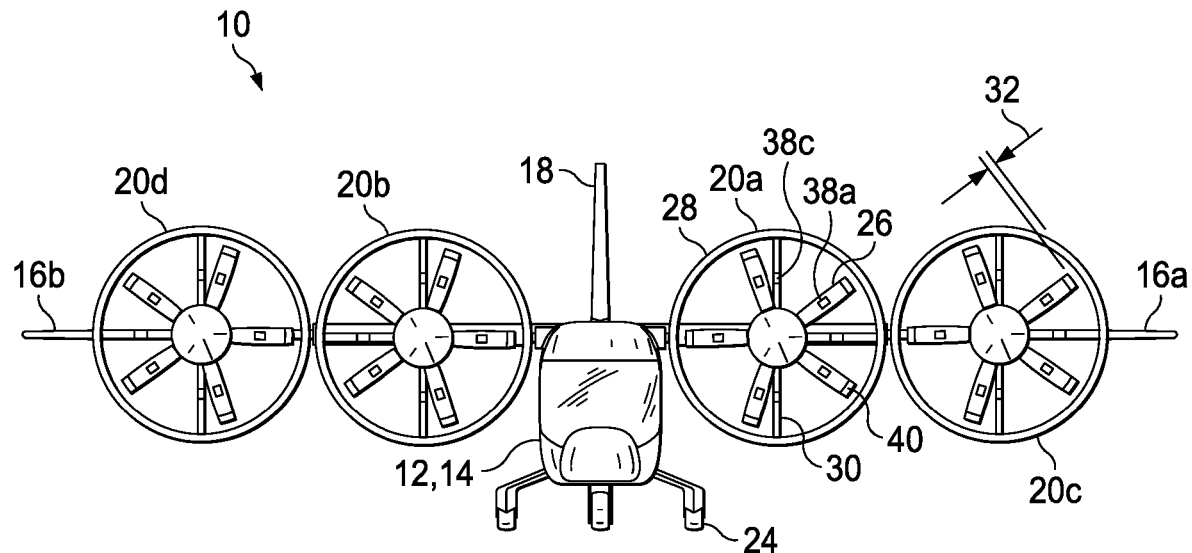
Figure 1C:
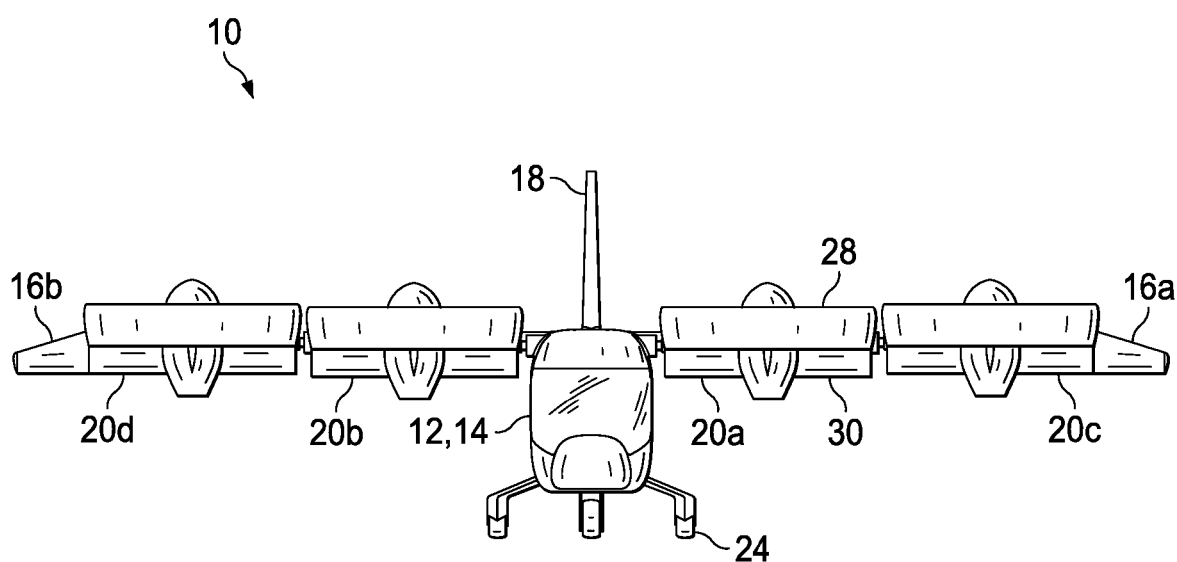
Figure 1F:
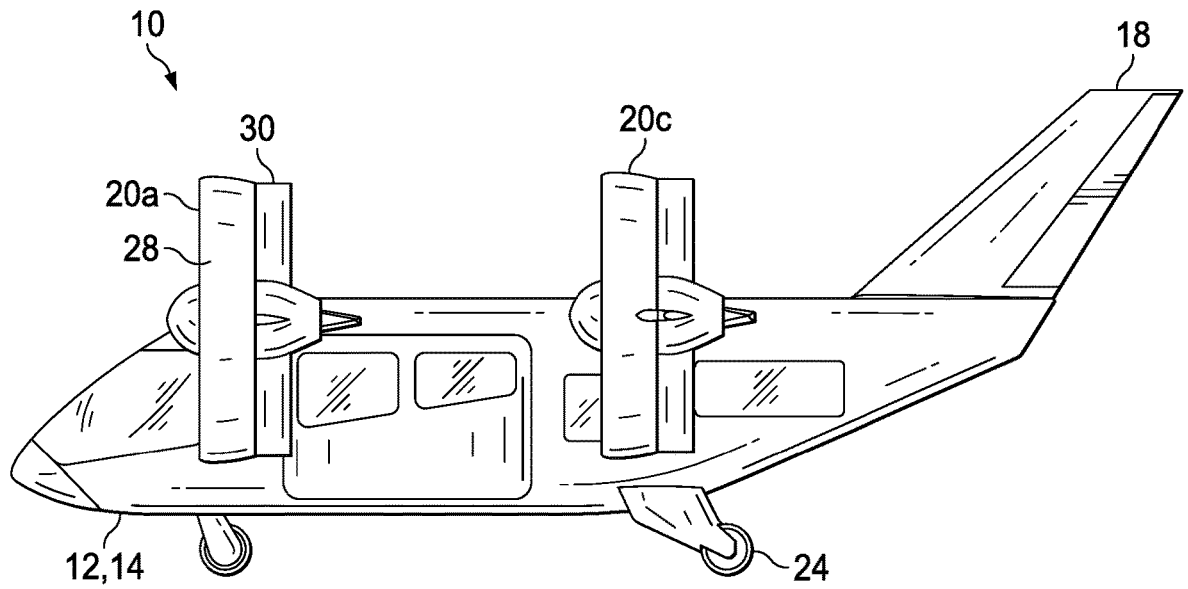
Figure 1E:
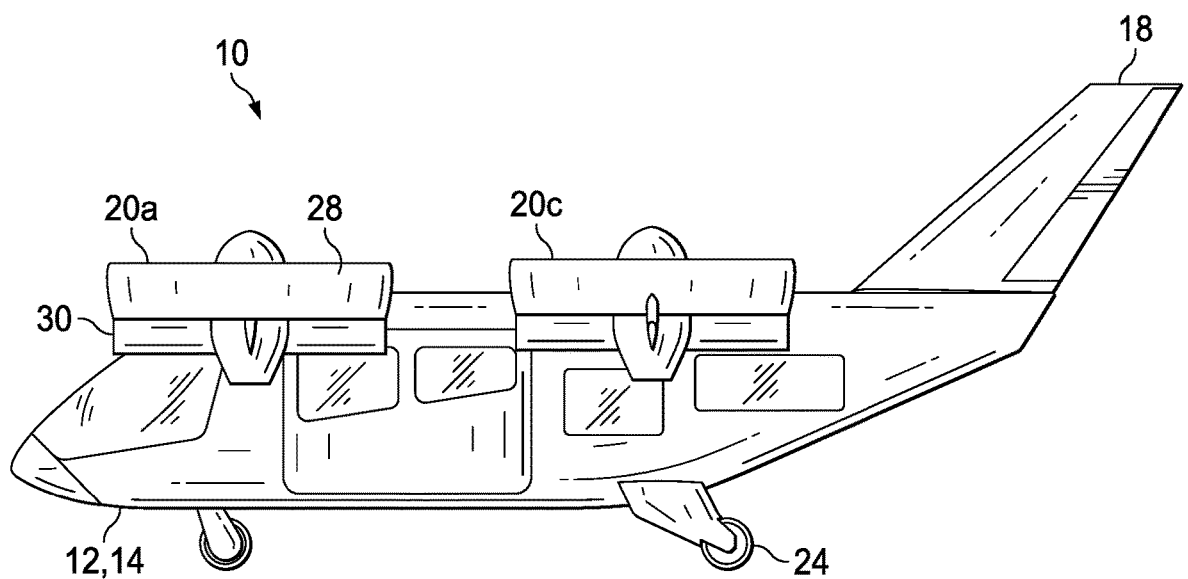

Referring to FIGS. 1A-1F in the drawings, various views of a ducted aircraft 10 having a tip gap monitoring and control system are depicted. FIGS. 1A, 1C and 1E depict ducted aircraft 10 in a vertical takeoff and landing (VTOL) orientation wherein the proprotor systems provide thrust-borne lift. FIGS. 1B, 1D and 1F depict ducted aircraft 10 in a forward flight orientation wherein the proprotor systems provide forward thrust with the forward airspeed of ducted aircraft 10 providing wing-borne lift, thereby enabling ducted aircraft 10 to have a high speed and/or high endurance forward flight mode. Ducted aircraft 10 has a longitudinal axis 10a that may also be referred to as the roll axis, a lateral axis 10b that may also be referred to as the pitch axis and a vertical axis 10c that may also be referred to as the yaw axis, as best seen in FIGS. 1A-1B. As illustrated, when longitudinal axis 10a and lateral axis 10b are both in a horizontal plane that is normal to the local vertical in the earth's reference frame, ducted aircraft 10 has a level flight attitude.

In the illustrated embodiment, ducted aircraft 10 has an airframe 12 including a fuselage 14, wings 16a, 16b and a tail assembly 18. Wings 16a, 16b have an airfoil cross-section that generates lift responsive to the forward airspeed of ducted aircraft 10. In the illustrated embodiment, wings 16a, 16b are straight wings with a tapered leading edge. It will be appreciated, however, that wings 16a, 16b may be of a wide variety of shapes, sizes and configurations, depending upon the performance characteristics desired. In the illustrated embodiment, wings 16a, 16b include ailerons to aid in roll and/or pitch control of ducted aircraft 10 during forward flight. Tail assembly 18 is depicted as a vertical fin, or stabilizer, that may include one or more rudders to control the yaw of ducted aircraft 10 during forward flight. In other embodiments, tail assembly 18 may have two or more vertical fins and/or a horizontal stabilizer that may include one or more elevators to control the pitch of ducted aircraft 10 during forward flight. It will be appreciated, however, that tail assembly 18 may be of a wide variety of shapes, sizes and configurations, depending upon the performance characteristics desired.

In the illustrated embodiment, ducted aircraft 10 includes four proprotor systems forming a two-dimensional distributed thrust array that is coupled to airframe 12. As used herein, the term "two-dimensional thrust array" refers to a plurality of thrust generating elements that occupy a two-dimensional space in the form of a plane. As used herein, the term "distributed thrust array" refers to the use of multiple thrust generating elements, each producing a portion of the total thrust output. The thrust array of ducted aircraft 10 includes a forward-port proprotor system 20a, a forward-starboard proprotor system 20b, an aft-port proprotor system 20c and an aft-starboard proprotor system 20d, which may be referred to collectively as proprotor systems 20. Forward-port proprotor system 20a and forward-starboard proprotor system 20b are each rotatably mounted to a shoulder portion of fuselage 12 at a forward station thereof. Aft-port proprotor system 20c is rotatably mounted on the outboard end of wing 16a. Aft-starboard proprotor system 20d is rotatably mounted on the outboard end of wing 16b. Proprotor systems 20 may each include at least one variable speed electric motor and a speed controller configured to provide variable speed control to the proprotor assembly over a wide range of rotor speeds.

When ducted aircraft 10 is operating in the VTOL flight mode and supported by thrust-borne lift, proprotor systems 20 each have a generally horizontal position such that the proprotor assemblies are rotating in generally the same horizontal plane, as best seen in FIGS. 1C and 1E. When ducted aircraft 10 is operating in the forward flight mode and supported by wing-borne lift, proprotor systems 20 each have a generally vertical position with the forward proprotor assemblies rotating generally in a forward vertical plane and the aft proprotor assemblies rotating generally in an aft vertical plane, as best seen in FIG. 1F. Transitions between the VTOL flight mode and the forward flight mode of ducted aircraft 10 are achieved by changing the angular positions of proprotor systems 20 between their generally horizontal positions and their generally vertical positions as discussed herein.

Ducted aircraft 10 may include a liquid fuel powered turbo-generator that includes a gas turbine engine and an electric generator. Preferably, the electric generator charges an array of batteries that provides power to the electric motors of proprotor systems 20 via a power management system. In other embodiments, the turbo-generator may provide power directly to the power management system and/or the electric motors of proprotor systems 20. In yet other embodiments, proprotor systems 20 may be mechanically driven by the power plant of ducted aircraft 10 via suitable gearing, shafting and clutching systems.

Ducted aircraft 10 has a fly-by-wire control system that includes a flight control computer 22 that is preferably a redundant digital flight control system including multiple independent flight control computers. Flight control computer 22 preferably includes non-transitory computer readable storage media including a set of computer instructions executable by one or more processors for controlling the operation of ducted aircraft 10. Flight control computer 22 may be implemented on one or more general-purpose computers, special purpose computers or other machines with memory and processing capability. Flight control computer 22 may include one or more memory storage modules including random access memory, non-volatile memory, removable memory or other suitable memory. Flight control computer 22 may be a microprocessor-based system operable to execute program code in the form of machine-executable instructions. Flight control computer 22 may be connected to other computer systems via a suitable communications network that may include both wired and wireless connections.

Flight control computer 22 communicates via a wired communications network within airframe 12 with the electronics nodes of each proprotor system 20. Flight control computer 22 receives sensor data from and sends flight command information to proprotor systems 20 such that each proprotor system 20 may be individually and independently controlled and operated. For example, flight control computer 22 is operable to individually and independently control the proprotor speed and collective blade pitch of each proprotor system 20 as well as the angular position of each proprotor system 20. Flight control computer 22 may autonomously control some or all aspects of flight operation for ducted aircraft 10. Flight control computer 22 is also operable to communicate with remote systems, such as a ground station via a wireless communications protocol. The remote system may be operable to receive flight data from and provide commands to flight control computer 22 to enable remote flight control over some or all aspects of flight operation for ducted aircraft 10. In addition, ducted aircraft 10 may be pilot operated such that a pilot interacts with a pilot interface that receives flight data from and provides commands to flight control computer 22 to enable onboard pilot control over some or all aspects of flight operation for ducted aircraft 10.

Ducted aircraft 10 includes landing gear 24 for ground operations. Landing gear 24 may include passively operated pneumatic landing struts or actively operated landing struts. In the illustrated embodiment, landing gear 24 includes a plurality of wheels that enable ducted aircraft 10 to taxi and perform other ground maneuvers. Landing gear 24 may include a passive brake system, an active brake system such as an electromechanical braking system and/or a manual brake system to facilitate parking as required during ground operations and/or passenger ingress and egress.

In the illustrated embodiment, proprotor systems 20 are ducted proprotor systems each having a five bladed proprotor assembly with variable pitch proprotor blades 26 operable for collective pitch control. In other embodiments, the number of proprotor blades could be either greater than or less than five and/or the proprotor blades could have a fixed pitch. Proprotor blades 26 of each proprotor system 20 are surrounded by a duct 28, which is supported by stators 30. Duct 28 and stators 30 may be formed from metallic, composite, carbon-based or other sufficiently rigid materials. The inclusion of duct 28 on each proprotor system 20 offers several benefits over open proprotor systems having exposed proprotor blades. For example, proprotor systems 20 emit less noise and are therefore preferred when a reduced noise environment is desired, such as during air reconnaissance, clandestine operations or flight in urban airspace. Ducts 28 increase safety for ground personnel and crew by preventing inadvertent collisions with a spinning proprotor. Openly exposed proprotors can lead to blade tip thrust losses during flight. By reducing proprotor blade tip losses, ducted proprotor systems 20 are more efficient in producing thrust than open proprotor systems of similar diameter, especially at low speed and high static thrust levels. Also, the thrust vectoring capabilities of open rotor systems are limited as is the use of pressure differentials to augment thrust.

The performance of each proprotor system 20 is sensitive to a tip gap 32 between the tips of proprotor blades 26 and the inner surfaces of ducts 28. Proprotor systems 20 may be designed to have a minimum tip gap 32 throughout the flight envelope to maximize duct performance. For example, proprotor systems 20 are most efficient while hovering in the VTOL flight mode when tip gap 32 is as small as possible. Conversely, tip gap 32 must be large enough to avoid collisions between proprotor blades 26 and ducts 28. Tip gap 32 may vary widely depending on the size of proprotor systems 20, desired flight attributes and other factors, but by way of non-limiting example is typically in a range between 0.05 inches and 1 inch, such as between 0.1 inches and 0.25 inches.

Furthermore, tip gap 32 changes as proprotor blades 26, ducts 28 and/or stators 30 deform or deflect under load and during unexpected events. For example, proprotor systems 20 experience higher loads in the conversion mode between the VTOL flight mode and the forward flight mode, caused in part by the dissymmetry of lift and vibration of proprotor blades 26 at a sideways angle of attack of proprotor blades 26 during the conversion mode. These increased loads can deform proprotor blades 26, ducts 28, stators 30 and/or other parts of proprotor systems 20, thereby affecting tip gap 32. Unexpected or imminent collisions with proprotor systems 20 during flight, such as bird strikes, also affect tip gap 32. Current ducted aircraft are unable to monitor and control the changing tip gap of their ducted proprotors, which necessitates shortening their proprotor blades more than necessary to prevent collisions between the proprotor blades and duct, which in turn leads to performance degradation.

Ducted aircraft 10 includes tip gap monitoring and control systems 34, 36 to address these and other tip gap issues of previous aircraft. Tip gap monitoring and control systems 34, 36 enable ducted aircraft 10 to actively or semi-actively enable proprotor blades 26 to be as close as possible to ducts 28 while mitigating the risk of collision between proprotor blades 26 and ducts 28. Tip gap monitoring system 34 includes sensors 38a, 38b, 38c coupled to proprotor blades 26, ducts 28 and stators 30, respectively, to detect parameters of proprotor systems 20 such as strain, deflection or tip gap distance. These sensor measurements are transmitted to flight control computer 22 so that tip gap monitoring system 34 can determine tip gap 32 for each proprotor system 20 based on the sensor measurements. Tip gap control system 36 may then actively or semi-actively adjust tip gap 32 by extending or retracting active blade tips 40 on the distal ends of proprotor blades 26 and/or active inner duct surfaces 42 circumferentially disposed on the inner surface of ducts 28. For example, tip gap control system 36 may extend or retract active blade tips 40 and/or active inner duct surfaces 42 by a tip gap adjustment distance determined by tip gap monitoring system 34. In other embodiments, tip gap control system 36 may control tip gap 32 using active blade tips 40 or active inner duct surfaces 42 based on the flight mode, flight condition or flight maneuver of ducted aircraft 10 or other parameters such as the blade pitch of proprotor blades 26. In yet other embodiments, ducted aircraft 10 may include a passive tip gap control system that retracts or extends proprotor blades 26 of each proprotor system 20 based on the collective pitch of proprotor blades 26. Alternatively, active blade tips 40 may be sacrificial blade tips that deform upon contact with ducts 28 to reduce damage to the main bodies of proprotor blades 26 as well as ducts 28.

It should be appreciated that ducted aircraft 10 is merely illustrative of a variety of aircraft that can implement the embodiments disclosed herein. Indeed, tip gap monitoring and control systems 34, 36, in both their active and semi-active implementations, as well as the passive tip gap control systems disclosed herein may be implemented on any aircraft that utilizes one or more ducts. Other aircraft implementations can include hybrid aircraft, tiltwing aircraft, unmanned aircraft, gyrocopters, propeller-driven airplanes, quadcopters, compound helicopters, jets, drones and the like. While many of the illustrative embodiments are described herein as being implemented on ducted proprotors with proprotor blades, the illustrative embodiments may also be implemented on rotor blades such as those present on helicopters or quadcopters. Tip gap monitoring and control systems 34, 36 and the passive tip gap control systems disclosed herein may also be implemented on ducted tail rotors or anti-torque systems. As such, those skilled in the art will recognize that tip gap monitoring and control systems 34, 36 and the passive tip gap control systems disclosed herein can be integrated into a variety of aircraft configurations. It should be appreciated that even though aircraft are particularly well-suited to implement the embodiments of the present disclosure, non-aircraft vehicles and devices can also implement the embodiments.

Figure 2:
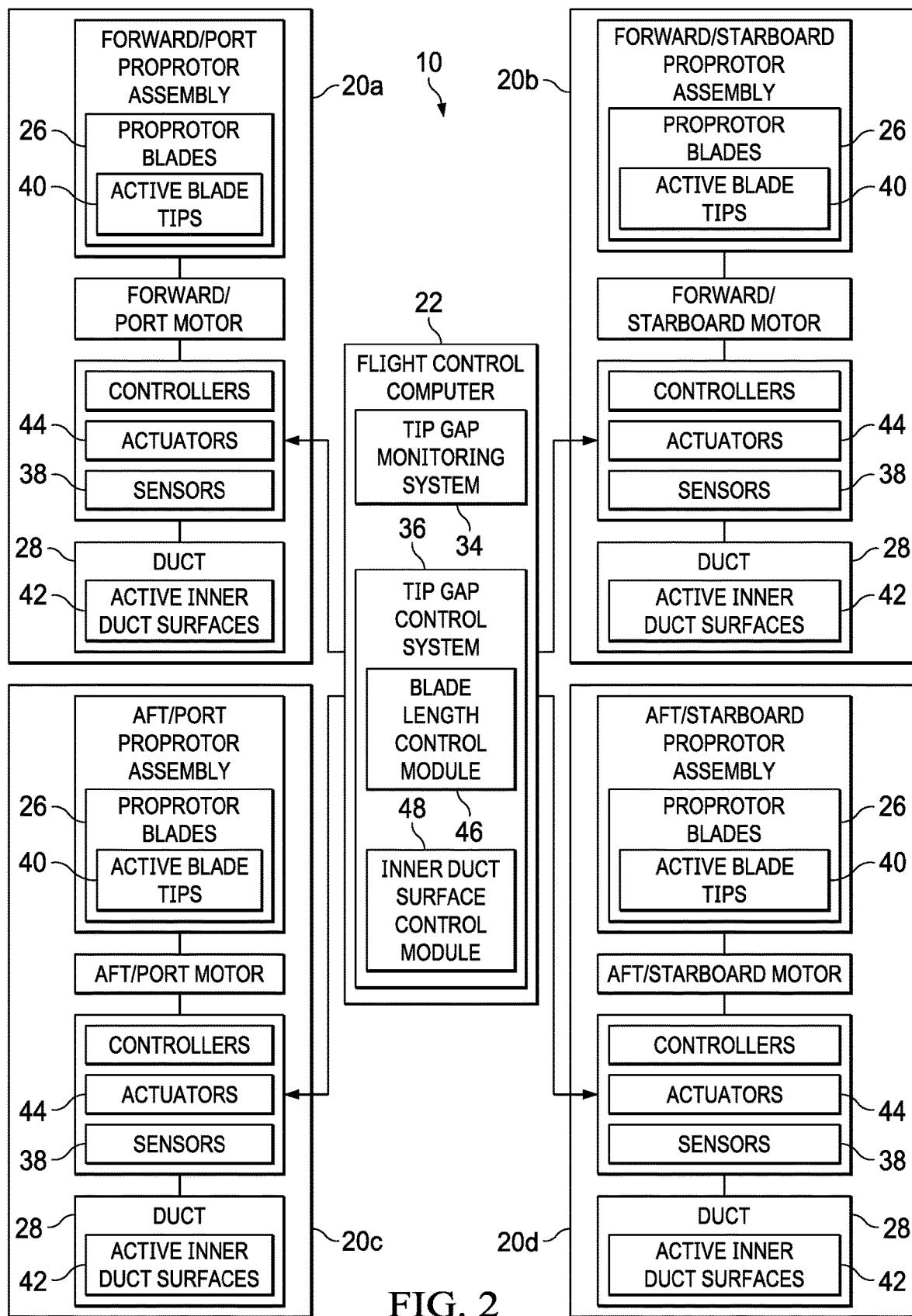
FIG. 2 is a block diagram of a propulsion and control system for a ducted aircraft having a tip gap monitoring and control system in accordance with embodiments of the present disclosure.

Referring additionally to FIG. 2 in the drawings, various systems of ducted aircraft 10 including tip gap monitoring and control systems 34, 36 are depicted. As discussed herein, ducted aircraft 10 includes flight control computer 22 and a two-dimensional distributed thrust array depicted as forward-port proprotor system 20a, forward-starboard proprotor system 20b, aft-port proprotor system 20c and aft-starboard proprotor system 20d. Each proprotor system 20 includes an electronics node depicted as having one or more controllers such as an electronic speed controller, one or more sensors 38 such as strain or distance sensors and one or more actuators 44 such as an active blade tip actuator, an active inner duct surface actuator, a rotor system position actuator and/or a blade pitch actuator. Each proprotor system 20 also includes at least one variable speed electric motor and a proprotor assembly coupled to the output drive of the electric motor.

Tip gap monitoring system 34 includes sensors 38, which generate sensor measurements of one or more parameters of proprotor systems 20. The sensor measurements generated by sensors 38 are transmitted to flight control computer 22, where tip gap monitoring system 34 determines the current tip gap for each proprotor system 20 based on the sensor measurements. Tip gap monitoring system 34 may then determine tip gap adjustment distances for each proprotor system 20 based on the tip gaps calculated from the sensor measurements. For example, tip gap monitoring system 34 may calculate a tip gap adjustment distance by which to adjust the tip gap of proprotor system 20a to equal a predetermined tip gap target, which may be larger or smaller than the measured tip gap. Tip gap control system 36 may then send actuator commands to actuators 44 of proprotor systems 20 to extend or retract active blade tips 40 and/or active inner duct surfaces 42 based on the tip gap adjustment distance(s) determined by tip gap monitoring system 34. More particularly, tip gap control system 36 includes a blade length control module 46 to generate and send blade tip actuator commands to actuators 44, which move active blade tips 40 of proprotor blades 26. Tip gap control system 36 also includes inner duct surface control module 48 to generate and send inner duct surface actuator commands to actuators 44 to move active inner duct surfaces 42 of ducts 28. The measured tip gaps of proprotor systems 20 may be nonuniform due to the unique loads experienced by each proprotor system 20. Therefore, the blade tip actuator commands and inner duct surface actuator commands generated by tip gap control system 36 may likewise be nonuniform for each proprotor system 20 such that the tip gaps of proprotor systems 20 may be independently adjusted.

Figure 3:
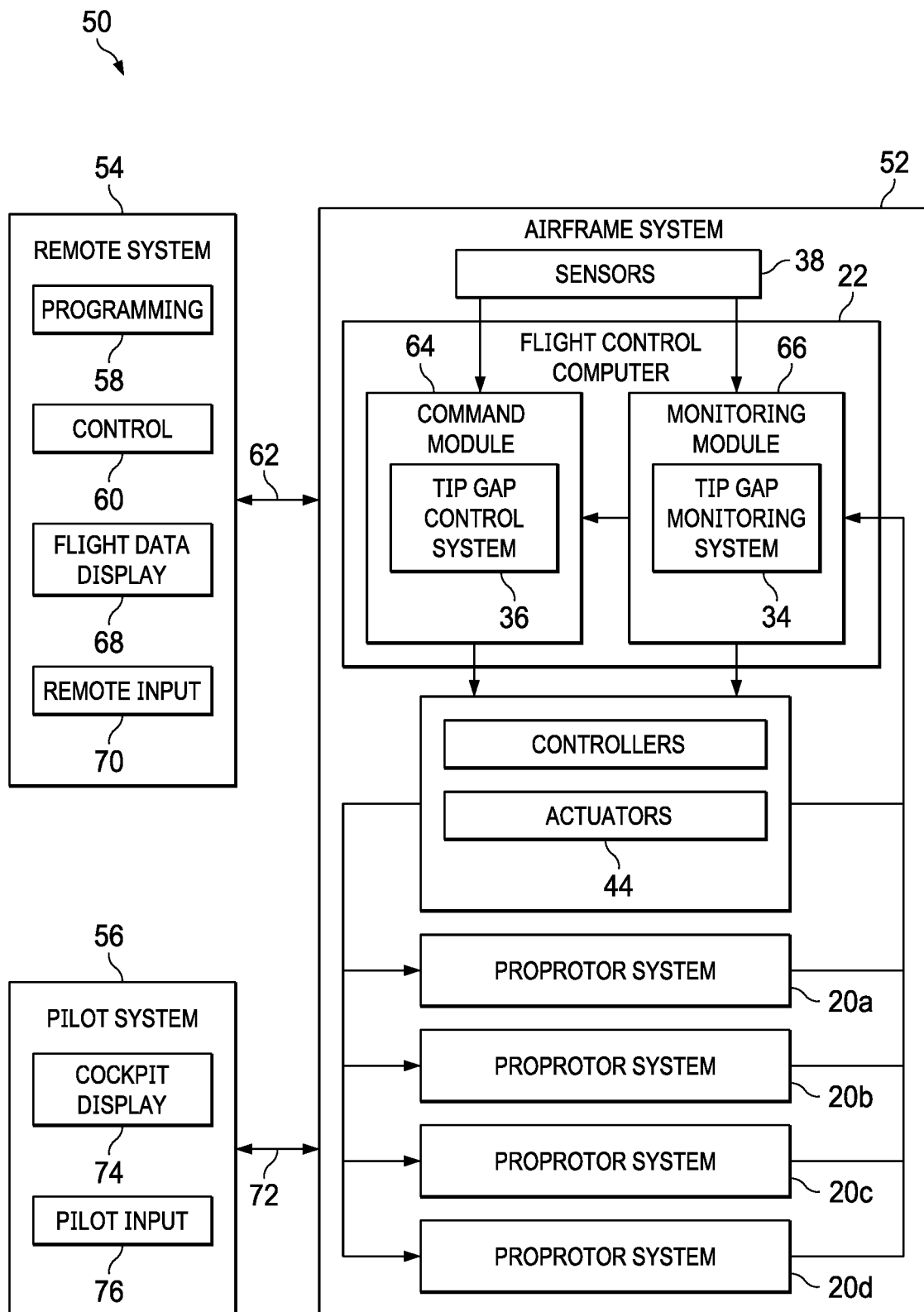
FIG. 3 is a block diagram of a control system for a ducted aircraft having a tip gap monitoring and control system in accordance with embodiments of the present disclosure.

Referring additionally to FIG. 3 in the drawings, a block diagram depicts a control system 50 operable for use with ducted aircraft 10 of the present disclosure. In the illustrated embodiment, control system 50 includes three primary computer based subsystems; namely, an airframe system 52, a remote system 54 and a pilot system 56. In some implementations, remote system 54 includes a programming application 58 and a remote control application 60. Programming application 58 enables a user to provide a flight plan and mission information to ducted aircraft 10 such that flight control computer 22 may engage in autonomous control over ducted aircraft 10. For example, programming application 58 may communicate with flight control computer 22 over a wired or wireless communication channel 62 to provide a flight plan including, for example, a starting point, a trail of waypoints and an ending point such that flight control computer 22 may use waypoint navigation during the mission.

In the illustrated embodiment, flight control computer 22 is a computer based system that includes a command module 64 and a monitoring module 66. It is to be understood by those skilled in the art that these and other modules executed by flight control computer 22 may be implemented in a variety of forms including hardware, software, firmware, special purpose processors and combinations thereof. Flight control computer 22 receives input from a variety of sources including internal sources such as sensors 38, controllers and actuators 44 and proprotor systems 20a-20d and external sources such as remote system 54 as well as global positioning system satellites or other location positioning systems and the like. During the various operating modes of ducted aircraft 10 including the VTOL flight mode, the forward flight mode and transitions therebetween, command module 64, which includes tip gap control system 36, provides commands to controllers and actuators 44. These commands enable independent operation of each proprotor system 20a-20d including tip gap adjustment, rotor speed and angular position. Flight control computer 22 receives feedback and sensor measurements from sensors 38, controllers, actuators 44 and proprotor systems 20a-20d. This feedback is processed by monitoring module 66, which includes tip gap monitoring system 34 and can supply correction data and other information to command module 64 and/or controllers and actuators 44. Sensors 38, such as strain sensors, distance sensors, accelerometers, vibration sensors, location sensors, attitude sensors, speed sensors, environmental sensors, fuel sensors, temperature sensors and the like also provide information to flight control computer 22 to further enhance autonomous control capabilities.

Some or all of the autonomous control capability of flight control computer 22 can be augmented or supplanted by remote flight control from, for example, remote system 54. Remote system 54 may include one or more computing systems that may be implemented on general-purpose computers, special purpose computers or other machines with memory and processing capability. Remote system 54 may be a microprocessor-based system operable to execute program code in the form of machine-executable instructions. In addition, remote system 54 may be connected to other computer systems via a proprietary encrypted network, a public encrypted network, the Internet or other suitable communication network that may include both wired and wireless connections. Remote system 54 communicates with flight control computer 22 via communication link 62 that may include both wired and wireless connections.

While operating remote control application 60, remote system 54 is configured to display information relating to one or more aircraft of the present disclosure on one or more flight data display devices 68. Remote system 54 may also include audio output and input devices such as a microphone, speakers and/or an audio port allowing an operator to communicate with other operators, a base station and/or a pilot onboard ducted aircraft 10. Display device 68 may also serve as a remote input device 70 if a touch screen display implementation is used, although other remote input devices such as a keyboard or joystick may alternatively be used to allow an operator to provide control commands to an aircraft being operated responsive to remote control.

Some or all of the autonomous and/or remote flight control of ducted aircraft 10 can be augmented or supplanted by onboard pilot flight control from a pilot interface system 56 that includes one or more computing systems that communicate with flight control computer 22 via one or more wired communication channels 72. Pilot system 56 preferably includes one or more cockpit display devices 74 configured to display information to the pilot. Cockpit display device 74 may be configured in any suitable form including, for example, a display panel, a dashboard display, an augmented reality display or the like. Pilot system 56 may also include audio output and input devices such as a microphone, speakers and/or an audio port allowing an onboard pilot to communicate with, for example, air traffic control. Pilot system 56 also includes a plurality of user interface devices 76 to allow an onboard pilot to provide control commands to ducted aircraft 10 including, for example, a control panel with switches or other inputs, mechanical control devices such as steering devices or sticks, voice control as well as other control devices.

Figure 4:
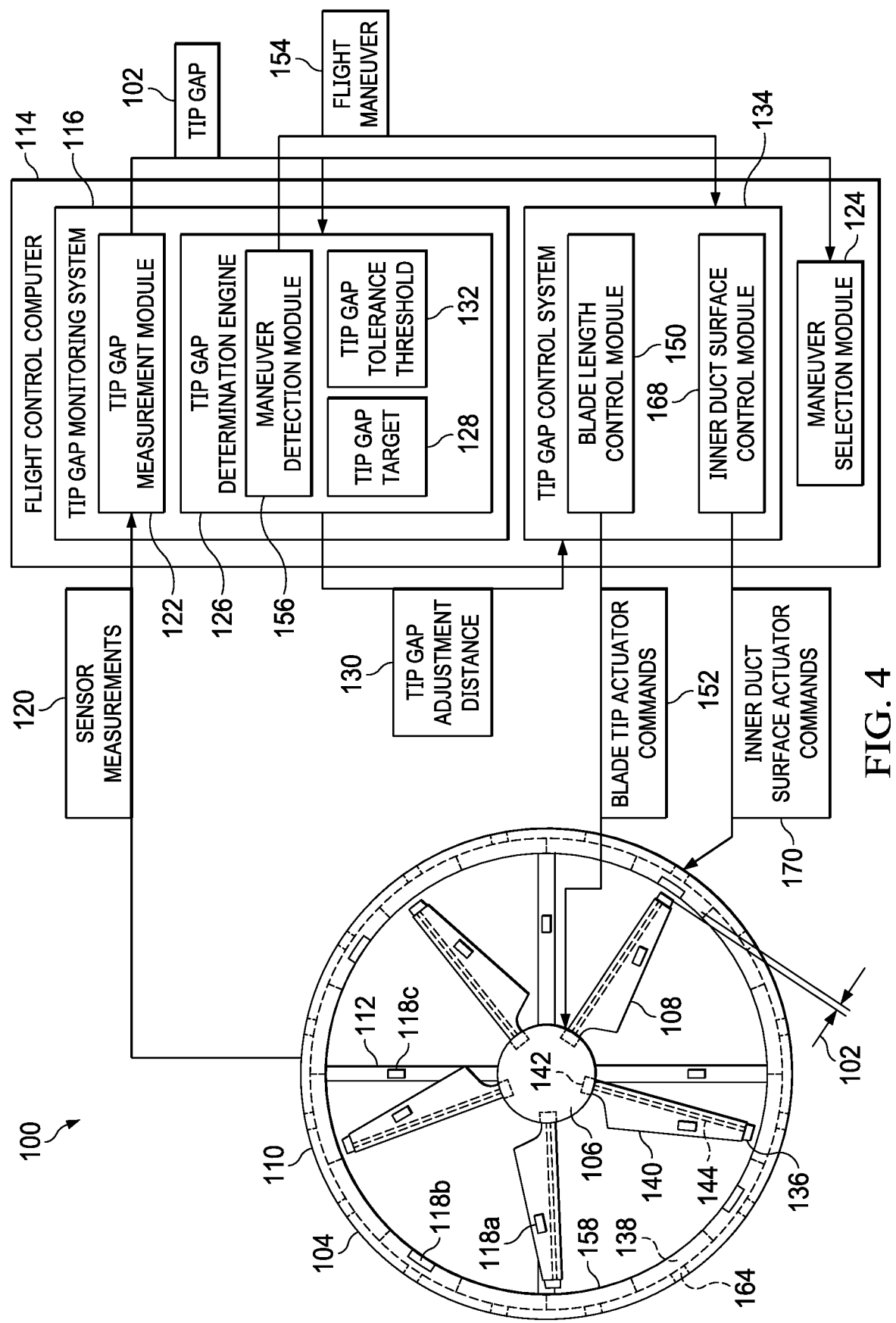
FIG. 4 is a schematic illustration of a tip gap monitoring and control system for a ducted aircraft in accordance with embodiments of the present disclosure.

Referring to FIG. 4 in the drawings, a tip gap monitoring and control system for a ducted aircraft such as ducted aircraft 10 in FIGS. 1A-1F is schematically illustrated and generally designated 100. Tip gap monitoring and control system of ducted aircraft 100 manages tip gap 102 for proprotor system 104. A single proprotor system 104 of ducted aircraft 100 is shown for purposes of describing the functionality of the tip gap monitoring and control system, although it will be appreciated by one of ordinary skill in the art that the tip gap monitoring and control system may manage the tip gaps of any number of proprotor systems for ducted aircraft 100. Proprotor system 104 includes a proprotor hub 106 to which proprotor blades 108 are coupled. Proprotor blades 108 are surrounded by duct 110, which is supported by stators 112. Proprotor system 104 is illustrated as including a horizontal stator and a vertical stator, although proprotor system 104 may include any number of stators in any orientation. Ducted aircraft 100 also includes flight control computer 114, which implements various systems and modules of the tip gap monitoring and control system.

Tip gap monitoring system 116 provides in-flight monitoring of tip gap 102 including the current or projected tip gap 102. Tip gap monitoring system 116 monitors tip gap 102 using sensors 118 coupled to proprotor system 104. Sensors 118 includes sensors 118a coupled to proprotor blades 108. Sensors 118a may be disposed inside or on the outer surface of proprotor blades 108. Sensors 118b are coupled to duct 110 and sensors 118c are coupled to stators 112. A portion of sensors 118 may also be coupled to proprotor hub 106. The number and placement of sensors 118 depends on a variety of factors including the number of proprotor blades 108, the number of stators 112, the design of proprotor system 104, sensor type, anticipated stresses, loads or flight conditions as well as other factors. Sensors 118 detect one or more parameters of proprotor system 104 to generate sensor measurements 120. In some embodiments, sensors 118 may be strain gauges whose sensor measurements 120 are proportional to the deflection, or strain, experienced by the components of proprotor system 104 to which they are attached. Strain gauges on proprotor blades 108, for example, may detect elongation of proprotor blades 108 due to centrifugal forces acting thereon. The strain gauges may also be used to detect loads on proprotor blades 108, duct 110 and/or stators 112 such as axial tension or compression loads on stators 112. Non-limiting examples of strain gauges that may be coupled to proprotor system 104 include foil strain gauges, optical strain gauges or laser strain gauges. Accelerometers may also be used to measure the deflection of the components of proprotor system 104. In some embodiments, sensors 118 may include blade pitch sensors and sensor measurements 120 may indicate the pitch of proprotor blades 108. Sensors 118 may also include optical gauges, laser sensors or accelerometers to measure other parameters of proprotor system 104.

Figure 5B:
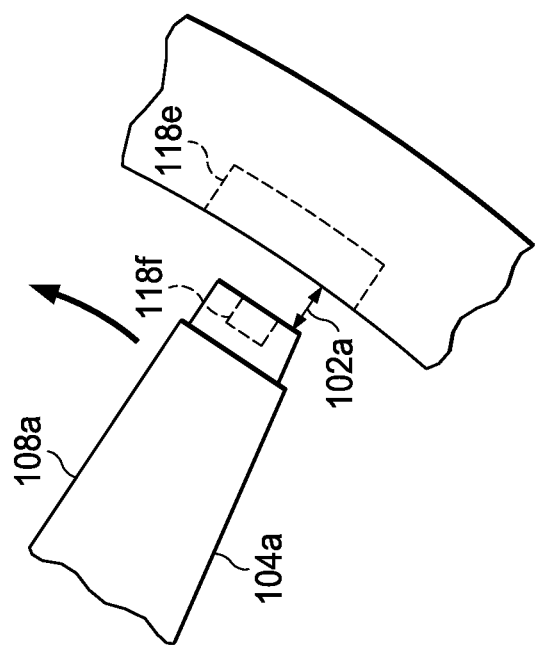
FIGS. 5A-5B are front views of a tip gap monitoring system utilizing distance sensors in accordance with embodiments of the present disclosure.
Figure 5A:
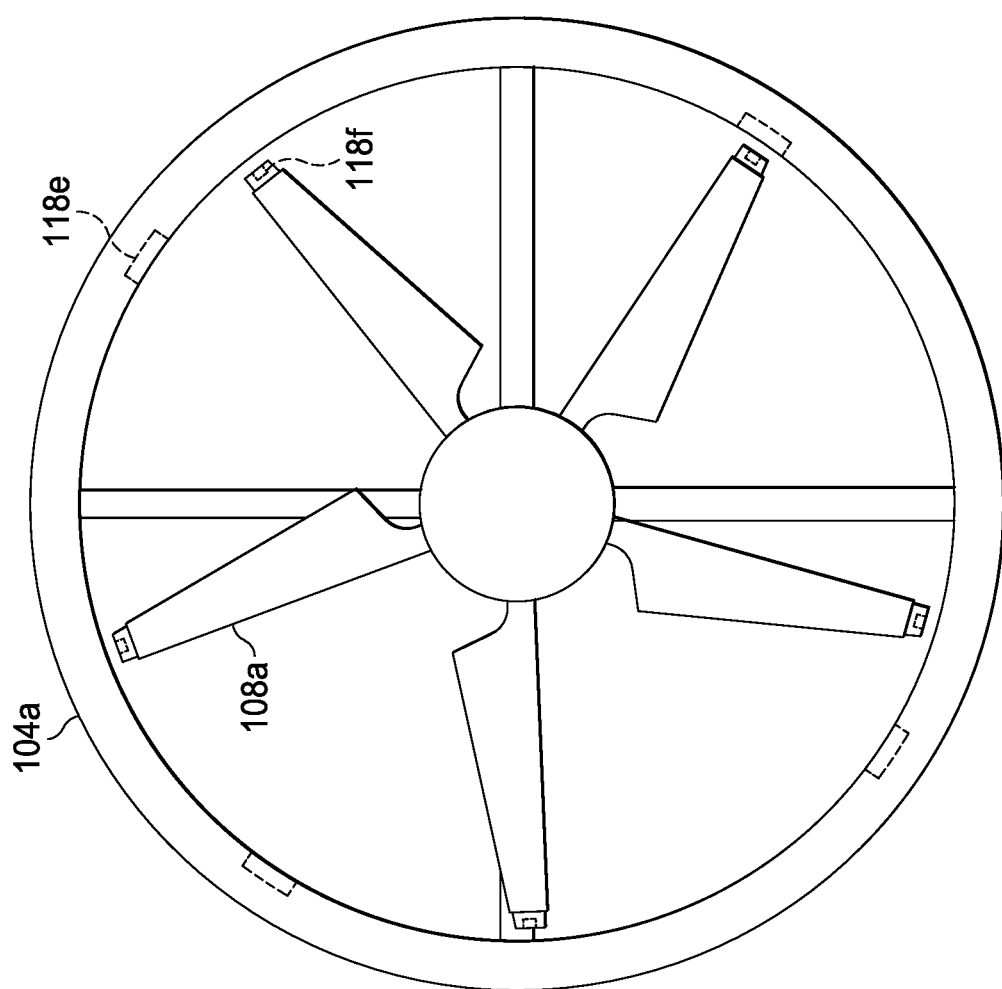

Referring to FIGS. 5A-5B in conjunction with FIG. 4 in the drawings, another implementation of tip gap monitoring system 116 is depicted in which sensors 118 are distance sensors 118e, 118f coupled to proprotor system 104a. Sensor measurements 120 taken by distance sensors 118e, 118f are tip gap distance measurements 102a for each proprotor blade 108a. Non-limiting examples of distance sensors 118e, 118f include Hall Effect sensors, laser sensors or optical sensors. In some embodiments, distance sensors 118f are magnets and distance sensors 118e are Hall Effect sensors that detect the proximity of magnets 118f as proprotor blades 108a rotate to generate tip gap distance measurements 102a. Any combination of the aforementioned strain gauges, distance sensors or other sensor types may be coupled to proprotor system 104 and utilized by tip gap monitoring system 116 to determine tip gap 102.

Referring back to FIG. 4, sensor measurements 120 are transmitted from sensors 118 on proprotor system 104 to flight control computer 114. Tip gap monitoring system 116 includes a tip gap measurement module 122 to determine tip gap 102 between duct 110 and proprotor blades 108 based on sensor measurements 120. Because tip gap 102 may differ for each proprotor blade 108, tip gap measurement module 122 may determine a respective tip gap 102 for each proprotor blade 108 based on sensor measurements 120. Assuming that tip gaps 102 differ for each proprotor blade 108, tip gap measurement module 122 may also determine a minimum, maximum, median or average tip gap 102 between duct 110 and proprotor blades 108. In some embodiments, sensors 118 may have nominal values and tip gap measurement module 122 may determine tip gap 102 by comparing sensor measurements 120 with the nominal values of sensors 118. In one non-limiting implementation, tip gap measurement module 122 may calculate tip gap 102 only if sensor measurements 120 differ from the nominal values for sensors 118 by a predetermined tolerance or noise threshold to reduce the processing requirements of tip gap measurement module 122. For example, in an embodiment in which sensors 118 are strain gauges, the strain measurements of sensor measurements 120 may be used to calculate strain if they exceed a threshold strain level. This threshold strain level may be determined using analysis of the duct structure, stress modeling, mapping and/or other methods. These threshold strain levels may be tested and validated for refinement. In other embodiments, tip gap measurement module 122 may continuously calculate tip gap 102 in real time to constantly monitor tip gap 102 during flight.

In some embodiments, tip gap measurement module 122 determines tip gap 102 based on the deflection or asymmetric loading experienced by proprotor system 104. In some implementations, tip gap measurement module 122 determines a structural deformity, or shape, of proprotor blades 108, duct 110 and/or stators 112 based on sensor measurements 120 from sensors 118 such as strain gauges coupled to proprotor system 104. In particular, strain measurements can be used to calculate loads on proprotor blades 108, duct 110 and/or stators 112 to determine the shape of these components based on the calculated loads. The structural deformity of proprotor blades 108, duct 110 and/or stators 112 may be determined through testing and calibration to flight loads, by computer simulation or by other numerical methods. In one example, the structural deformity or shape of duct 110 is determined using strain gauges on stators 112 to measure axial loads on stators 112 such as tension or compression loads. In another example, strain measurements from strain gauges on proprotor blades 108 may be used to determine any structural deformities of proprotor blades 108 due to centrifugal forces or other loads. Once any structural deformities of proprotor system 104 are determined, tip gap measurement module 122 may then determine tip gap 102 based on any calculated structural deformities of proprotor blades 108, duct 110 and/or stators 112. For example, the derived shape of proprotor blades 108, duct 110 and/or stators 112 may be compared to the nominal condition or shape of proprotor blades 108, duct 110 and/or stators 112, respectively, to determine tip gap 102 at the tips of each proprotor blade 108. By determining tip gap 102 based on structural deformities of proprotor system 104, tip gap measurement module 122 may calculate changes in tip gap 102 due to asymmetric loading of proprotor system 104, in-flight or imminent collisions with proprotor system 104 such as bird strikes, load changes on proprotor system 104 due to flight conditions such as flight mode or flight maneuvers as well as other events and factors.

In some embodiments, a maneuver selection module 124 may utilize tip gap 102, as determined by tip gap measurement module 122, to determine, select or preclude certain flight maneuvers that ducted aircraft 100 may perform. For example, certain maneuvers may cause excessive structural deformity of the components of proprotor system 104, and maneuver selection module 124 may avoid such maneuvers if tip gap 102 is too small, thereby reducing the likelihood of collision between proprotor blades 108 and duct 110. Maneuver selection module 124 may also be used to avoid maneuvers causing large increases in tip gap 102 that degrade the performance of ducted aircraft 100. Tip gap monitoring system 116 may thus allow for safe envelope expansion for flight testing of ducted aircraft 100. Sensor measurements 120 may also indicate the absolute or relative position of sensors 118, and therefore the position of underlying component(s) to which they are attached, and these positional sensor measurements 120 may be used to determine tip gap 102. For example, sensors 118 may be accelerometers that are used to measure movement of the portion (s) of proprotor system 104 to which the accelerometers are coupled. The movement detected by the accelerometer may be used by tip gap measurement module 122 to determine any structural deformities of proprotor system 104. The blade pitch of proprotor blades 108, as indicated by sensor measurements 120 and/or flight control computer 114, may also be used by tip gap measurement module 122 to determine tip gap 102.

Tip gap monitoring system 116 may also include a tip gap determination engine 126 that compares tip gap 102 calculated by tip gap measurement module 122 with a tip gap target 128 to determine a tip gap adjustment distance 130. Tip gap target 128 is the desired distance for tip gap 102 and may be determined based on a number of factors such as the flight condition of ducted aircraft 100 including the flight maneuver or flight mode currently being implemented by ducted aircraft 100. Tip gap adjustment distance 130 is the distance that tip gap 102 is to be adjusted to equal tip gap target 128. In some examples, tip gap adjustment distance 130 may be determined by calculating the difference between tip gap 102 and tip gap target 128. Tip gap adjustment distance 130 may then be outputted by tip gap determination engine 126 for use by other systems or modules of flight control computer 114 including for purposes of active or semi-active control of tip gap 102. In some embodiments, tip gap adjustment distance 130 may be outputted in response to tip gap 102 differing from tip gap target 128 by a tip gap tolerance threshold 132 so that tip gap adjustment distance 130 need only be processed by other systems of flight control computer 114 when tip gap adjustment distance 130 is large enough to merit active or semi-active control of tip gap 102.

Figure 6A:
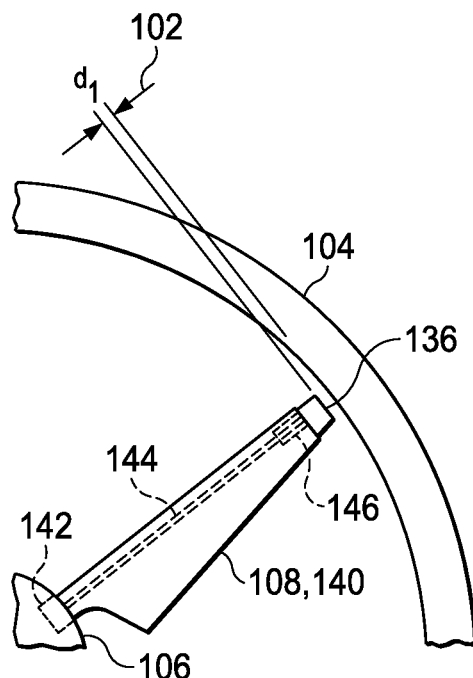
FIGS. 6A-6G are various views of a tip gap control system utilizing active blade tips in accordance with embodiments of the present disclosure.
Figure 6B:
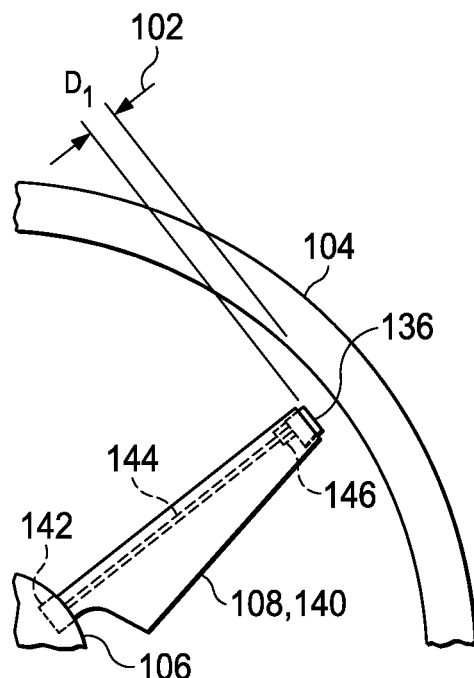

The tip gap monitoring and control system of ducted aircraft 100 includes tip gap control system 134 to actively or semi-actively control tip gap 102 using either or both of active blade tips 136 or active inner duct surfaces 138. Referring to FIGS. 6A-6B in conjunction with FIG. 4 in the drawings, each proprotor blade 108 of proprotor system 104 includes a respective active blade tip 136. Active blade tips 136 are slidably, or telescopically, coupled to open distal ends of main bodies 140 of proprotor blades 108. Actuators 142 are disposed at proprotor hub 106 and coupled to active blade tips 136 by spanwise links 144. Each actuator 142 may include a solenoid for electromagnetic control of active blade tips 136. Each spanwise link 144 may be a cable, rod or other member connecting actuators 142 to active blade tips 136.

Actuators 142 move active blade tips 136 into a plurality of positions including the extended position shown in FIG. 6A and the retracted position shown in FIG. 6B. Actuators 142 may also move active blade tips 136 into an infinite number of intermediate positions between the extended position shown in FIG. 6A and the retracted position shown in FIG. 6B. Active blade tips 136 move radially outward or inward along a spanwise axis of each proprotor blade 108. In the extended position, active blade tips 136 are extended from the open distal ends of main bodies 140 of proprotor blades 108 to form tip gap 102 having a distance $d_1$. In the retracted position, active blade tips 136 are retracted into main bodies 140 of proprotor blades 108 to form tip gap 102 having a distance $D_1$. Distance $D_1$ is greater than distance $d_1$ such that tip gap 102 is larger when active blade tips 136 are in the retracted position shown in FIG. 6B. Because each active blade tip 136 is associated with a respective actuator 142, active blade tips 136 may be independently actuated to permit nonuniform positioning of active blade tips 136. For example, only one or two of active blade tips 136 may be fully or partially retracted while the remaining active blade tips of proprotor system 104 are extended. One scenario in which nonuniform positioning of active blade tips 136 may be useful is when proprotor blades 108 experience nonuniform deflection or deformity loads. In some embodiments, each active blade tip 136 may be coupled to a respective spring 146 that biases the active blade tips 136 into either the extended position or the retracted position. In one non-limiting example, springs 146 may bias active blade tips 136 into the extended position and actuators 142 may be configured to pull active blade tips 136 radially inward against the bias of springs 146 to provide rapid two-way movement of active blade tips 136. In other example, centrifugal force during operation supplements or replaces the need for spring 146, in which case spring 146 may be useful to keep the system in tension when proprotor system 104 is not in operation.

Figure 6C:
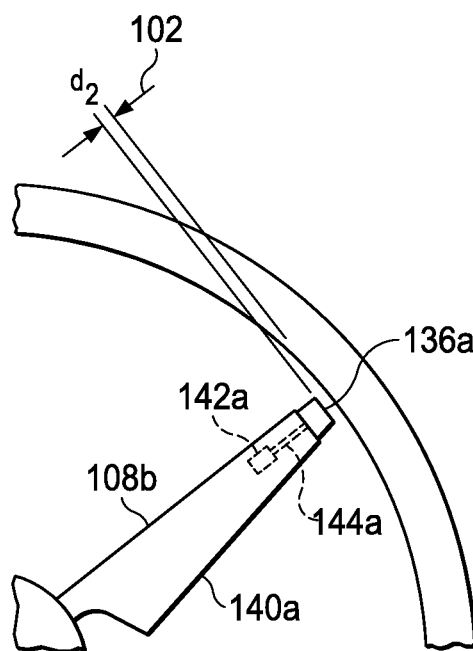
Figure 6D:
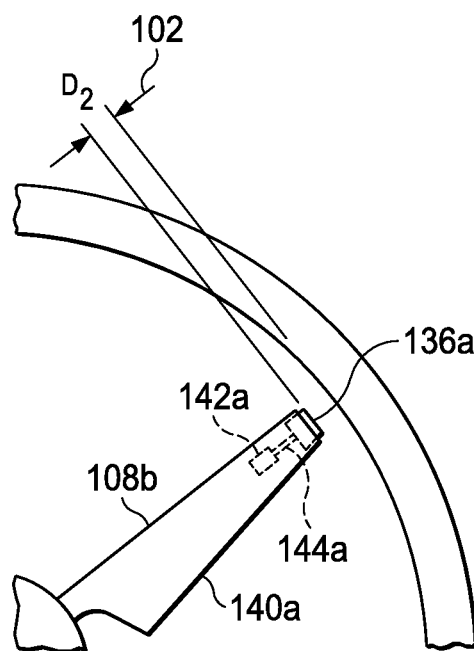

FIGS. 6C-6G illustrate alternative active blade tip configurations. In FIGS. 6C-6D, actuator 142a for active blade tip 136a is located at a distal portion of main body 140a of proprotor blade 108b, thereby shortening spanwise link 144a between actuator 142a and active blade tip 136a. Actuator 142a moves active blade tip 136a between the extended position shown in FIG. 6C and the retracted position shown in FIG. 6D. Distance $D_2$ is greater than distance $d_2$ such that tip gap 102 is larger when active blade tip 136a is in the retracted position shown in FIG. 6D. In other embodiments, actuator 142a may be located anywhere within main body 140a of proprotor blade 108b including the root or middle portions of main body 140a. In yet other embodiments, actuator 142a may abut active blade tip 136a without the need for spanwise link 144a or may be located inside of active blade tip 136a. Actuator 142a may also be used in conjunction with a spring to bias active blade tip 136a in either the extended or retracted position, although centrifugal force may instead be used to bias blade tip 136a into the extended position.

Figure 6E:
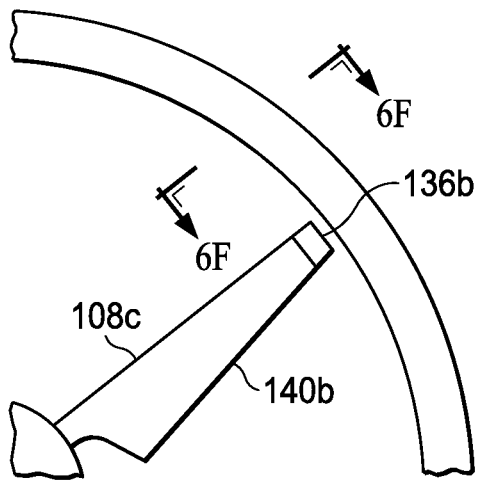
Figure 6F:
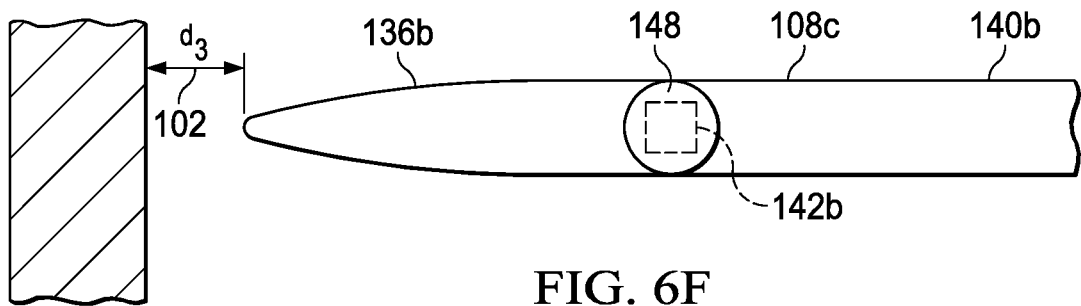
Figure 6G:
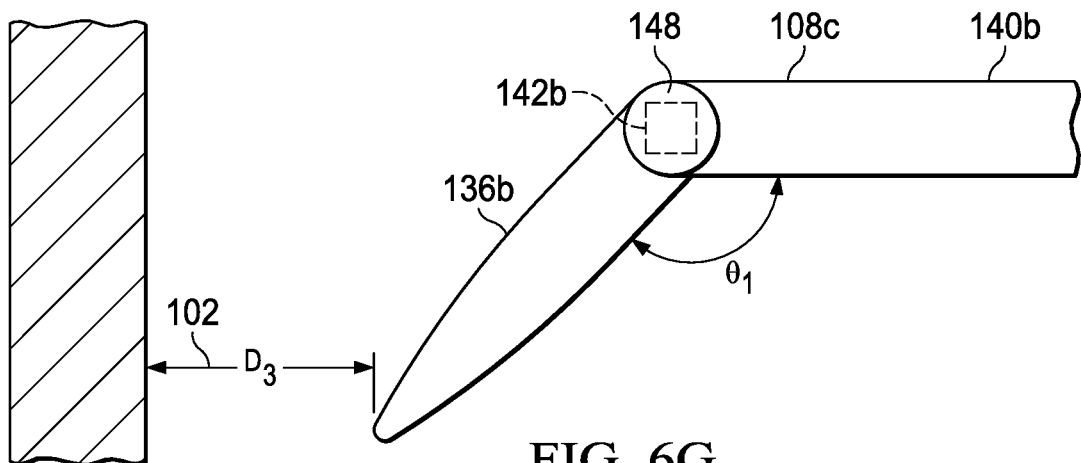

In FIGS. 6E-6G, active blade tip 136b is hingeably coupled to the distal end of main body 140b of proprotor blade 108c at hinge 148. Actuator 142b, which may be located in hinge 148 or elsewhere, moves active blade tip 136b between the extended position shown in FIG. 6F and the retracted position shown in FIG. 6G. In the extended position, active blade tip 136b is substantially coplanar with main body 140b. In the retracted position, active blade tip 136b forms an angle $\theta_1$ of less than 180 degrees with main body 140b. In the illustrated embodiment, angle $\theta_1$ is an obtuse angle and active blade tip 136b is non-coplanar with main body 140b in the retracted position. When active blade tip 136b is in the extended position, tip gap 102 has a distance $d_3$, which is shorter than distance $D_3$ of tip gap 102 when active blade tip 136b is in the retracted position.

Referring back to FIG. 4, tip gap control system 134 includes a blade length control module 150 to actively or semi-actively actuate active blade tips 136 to maintain a desired tip gap 102 for safety and increased performance. Blade length control module 150 generates blade tip actuator commands 152 to control the position of active blade tips 136. Blade tip actuator commands 152 are transmitted from flight control computer 114 to proprotor system 104 so that actuators 142 extend or retract active blade tips 136 to control tip gap 102 between duct 110 and proprotor blades 108. In some embodiments, blade tip actuator commands 152 include tip gap adjustment distance 130 determined by tip gap monitoring system 116. Upon receiving blade tip actuator commands 152, actuators 142 may then move active blade tips 136 by tip gap adjustment distance 130 so that tip gap 102 is substantially equal to tip gap target 128. In certain embodiments, blade length control module 150 generates blade tip actuator commands 152 in response to receiving tip gap adjustment distance 130 from tip gap monitoring system 116. While blade length control module 150 may continuously adjust active blade tips 136 in real time to match tip gap target 128 by sending tip gap adjustment distance 130 to actuators 142 regardless of magnitude, in other embodiments blade length control module 150 may generate blade tip actuator commands 152 in response to tip gap adjustment distance 130 exceeding a tip gap adjustment distance threshold to avoid micro-adjustments below such a threshold. Blade tip actuator commands 152 may extend or retract active blade tips 136 uniformly or may include one or more blade-specific blade tip actuator commands, each corresponding to a respective one of active blade tips 136 for nonuniform positioning. Thus, blade length control module 150 may extend or retract all or a portion of active blade tips 136 at any given time. For example, blade tip actuator commands 152 may include a blade-specific blade tip actuator command that extends only one of active blade tips 136 if such proprotor blade, for example, is shorter than the other proprotor blades due to deflection or other reasons.

While tip gap control system 134 may actively control tip gap 102 using active blade tips 136 during all portions of a flight, tip gap control system 134 may also semi-actively control active blade tips 136. Semi-active control of active blade tips 136 may be particularly useful in response to events such as bird strikes or severe maneuvers of ducted aircraft 100. In some semi-active implementations, blade tip actuator commands 152 may include a retract command or an extend command for proprotor blades 108, and actuators 142 may move active blade tips 136 by a predetermined distance in response to receiving the retract or extend command. For example, blade length control module 150 may send blade tip actuator commands 152 that retract active blade tips 136 by a predetermined distance in response to detecting an imminent or actual collision such as a bird strike with proprotor system 104 during flight. Blade length control module 150 may also generate blade tip actuator commands 152 that retract active blade tips 136 by a predetermined distance in response to tip gap monitoring system 116 detecting a structural deformity of proprotor system 104. In one non-limiting example, active blade tips 136 may be commanded to retract only if the structural deformity meets or exceeds a structural deformity threshold.

Blade length control module 150 may also generate blade tip actuator commands 152 based on the flight condition of ducted aircraft 100. For example, blade length control module 150 may generate blade tip actuator commands 152 that retract active blade tips 136 by a predetermined or calculated distance if ducted aircraft 100 executes a flight maneuver 154 that has been predetermined to subject proprotor system 104 to excessive loading. Flight maneuver 154 may be detected by flight control computer 114 using a maneuver detection module 156. Maneuver detection module 156 may use sensors 118, pilot inputs, remote inputs or other parameters to determine flight maneuver 154 being executed by ducted aircraft 100.

Blade length control module 150 may also generate blade tip actuator commands 152 based on the flight mode of ducted aircraft 100. Examples of such flight modes include the VTOL flight mode, the forward flight mode and the conversion flight mode described in FIGS. 1A-1F. The rotational speed of proprotor system 104 is lower in the forward flight mode than in the VTOL flight mode, which expands tip gap 102 in the forward flight mode. Blade length control module 150 may either supplement or compensate for the naturally higher tip gap 102 in the forward flight mode. Thus, blade length control module 150 may generate blade tip actuator commands 152 that move active blade tips 136 between the retracted and extended positions in response to ducted aircraft 100 converting between the VTOL flight mode and the forward flight mode. For example, blade length control module 150 may generate blade tip actuator commands 152 that move active blade tips 136 by a calculated or predetermined amount from the retracted position to the extended position in response to ducted aircraft 100 converting from the VTOL flight mode to the forward flight mode, thus compensating for the naturally higher tip gap in the forward flight mode. In another example, blade length control module 150 may generate blade tip actuator commands 152 that move active blade tips 136 by a calculated or predetermined amount from the extended position to the retracted position in response to ducted aircraft 100 converting from the VTOL flight mode to the forward flight mode, thus supplementing tip gap 102 to provide additional safety. Because the blade pitch of proprotor blades 108 changes when converting from the VTOL flight mode to the forward flight mode, blade length control module 150 may also generate blade tip actuator commands 152 based on the blade pitch of proprotor blades 108. Because proprotor system 104 typically experiences higher loading in the conversion flight mode, blade length control module 150 may also generate blade tip actuator commands 152 that retract active blade tips 136 by a calculated or predetermined amount when ducted aircraft 100 is in the conversion flight mode between the VTOL flight mode and the forward flight mode.

Figure 7B:
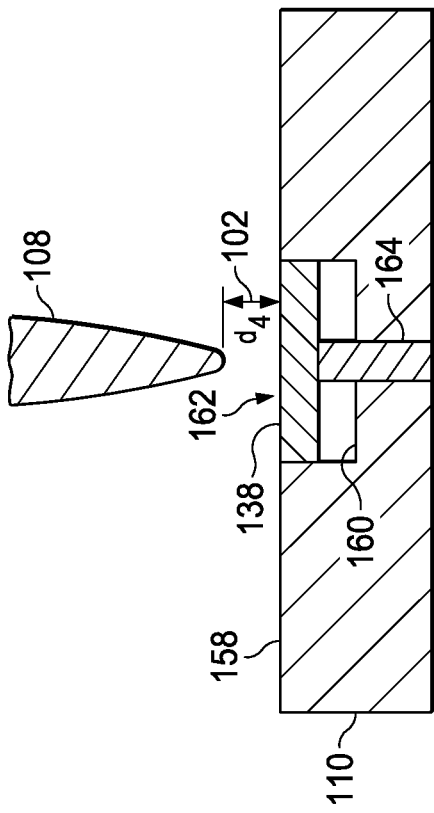
FIGS. 7A-7G are various views of a tip gap control system utilizing active inner duct surfaces in accordance with embodiments of the present disclosure.
Figure 7C:
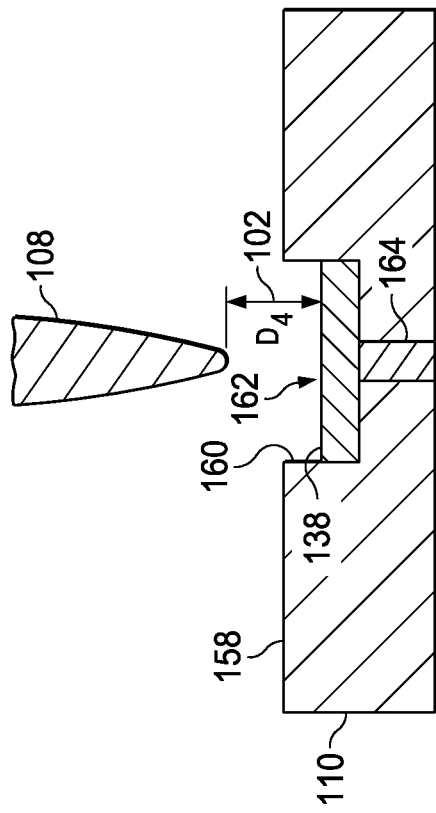
Figure 7A:
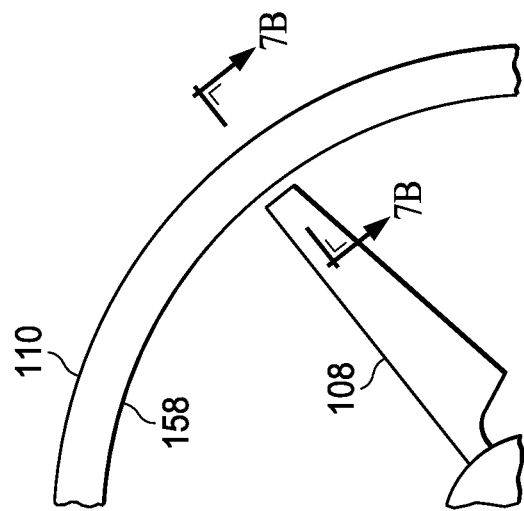

Additionally or alternatively, tip gap control system 134 may control tip gap 102 using active inner duct surfaces 138. Referring to FIGS. 7A-7C in conjunction with FIG. 4 of the drawings, duct 110 has an inner surface 158 that forms a circumferential cavity, or slot, 160. Active inner duct surfaces 138 are actuated segmented surfaces circumferentially disposed on inner surface 158 of duct 110. The tips of proprotor blades 108 pass adjacent to a blade pass band 162 on inner surface 158 of duct 110. Active inner duct surfaces 138 are disposed along blade pass band 162 and slidably coupled to duct 110 at cavity 160.

Each active inner duct surface 138 is coupled to a respective actuator 164. Actuators 164 move active inner duct surfaces 138 between the extended position shown in FIG. 7B and the retracted position shown in FIG. 7C as well as intermediate positions therebetween. Actuators 164 are disposed inside of duct 110 and may include a solenoid, springs or other actuating components. Active inner duct surfaces 138 are substantially flush with inner surface 158 of duct 110 in the extended position. Active inner duct surfaces 138 slide into cavity 160 in the retracted position to increase tip gap 102 at blade pass band 162. Distance $D_4$ is greater than distance $d_4$ such that tip gap 102 is larger when active inner duct surfaces 138 are in the retracted position shown in FIG. 7C. Using active inner duct surfaces 138, duct 110 may be constricted or expanded at blade pass band 162 while maintaining the overall smoothness of inner surface 158. In some embodiments, active inner duct surfaces 138 may be extended beyond the position shown in FIG. 7B so that active inner duct surfaces 138 act as bumpouts to further reduce tip gap 102. Because each active inner duct surface 138 is coupled to a respective actuator 164, active inner duct surfaces 138 may be independently actuated to permit nonuniform positioning of active inner duct surfaces 138.

Figure 7D:
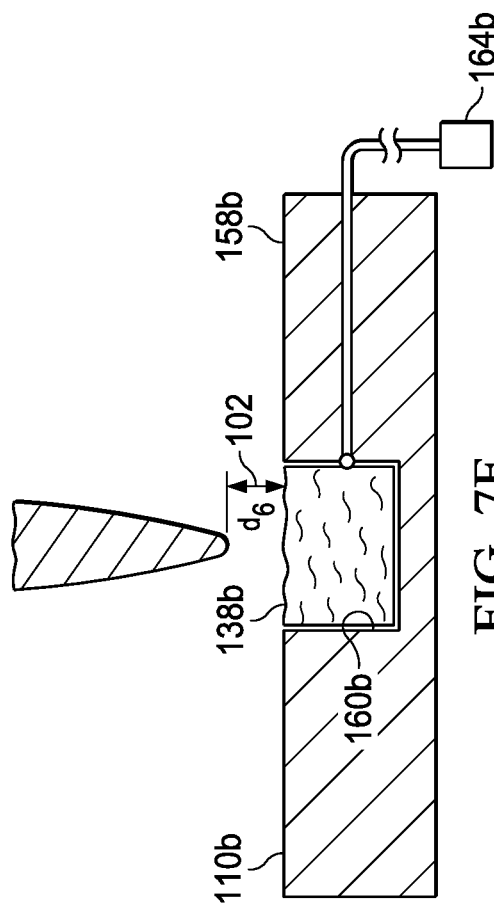
Figure 7F:
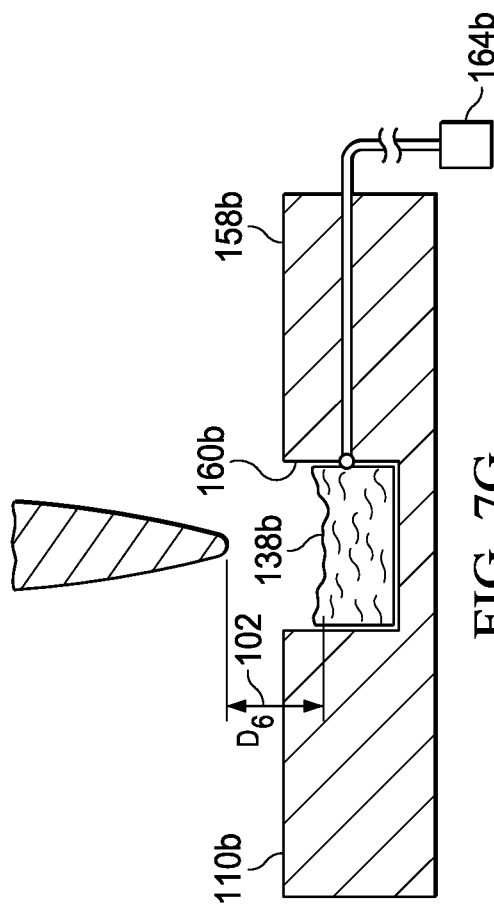
Figure 7E:
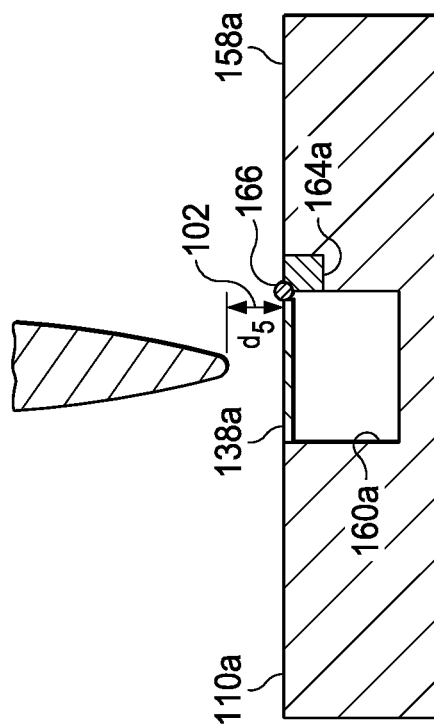

FIGS. 7D-7G illustrate alternative configurations of the active inner duct surfaces. In FIGS. 7D-7E, active inner duct surface 138a is hingeably coupled to inner surface 158a of duct 110a at cavity 160a via hinge 166. Active inner duct surface 138a may be a flap or thin sheet plate. Actuator 164a rotates active inner duct surface 138a between the extended position shown in FIG. 7D and the retracted position shown in FIG. 7E. In the extended position, active inner duct surface 138a is substantially flush with inner surface 158a of duct 110a. In the retracted position, active inner duct surface 138a is rotated into cavity 160a. Distance $D_5$ is greater than distance $d_5$ such that tip gap 102 is larger when active inner duct surface 138a is in the retracted position shown in FIG. 7E. In some embodiments, active inner duct surface 138a may be extended further than the extended position shown in FIG. 7D to further reduce tip gap 102.

Figure 7G:
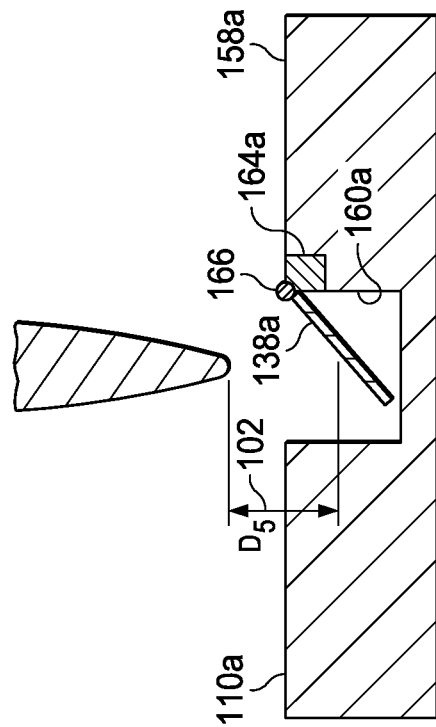

In FIGS. 7F-7G, active inner duct surface 138b is fillable with fluid. Fluid-filled active inner duct surface 138b is disposed in cavity 160b. The fluid inside fluid-filled active inner duct surface 138b may be a liquid or a gas. Fluid-filled active inner duct surface 138b may be tubular or have any cross-sectional shape. Actuator 164b is a pump that injects and removes fluid to and from active inner duct surface 138b. Actuator pump 164b fills active inner duct surface 138b with fluid in the extended position such that fluid-filled active inner duct surface 138b is substantially flush with inner surface 158b of duct 110b as shown in FIG. 7F. Actuator pump 164b removes fluid from fluid-filled active inner duct surface 138b in the retracted position as shown in FIG. 7G. Thus, active inner duct surface 138b is inflated in the extended position and deflated in the retracted position. Distance $D_6$ is greater than distance $d_6$ such that tip gap 102 is larger when fluid-filled active inner duct surface 138b is in the retracted position shown in FIG. 7G.

Referring back to FIG. 4, tip gap control system 134 includes an inner duct surface control module 168 to actively or semi-actively actuate active inner duct surfaces 138 to maintain a desired tip gap 102 for safety and increased performance. Inner duct surface control module 168 generates inner duct surface actuator commands 170 to control the position of active inner duct surfaces 138. Inner duct surface actuator commands 170 are transmitted from flight control computer 114 to proprotor system 104 so that actuators 164 extend or retract active inner duct surfaces 138 to control tip gap 102 between duct 110 and proprotor blades 108. In some embodiments, inner duct surface actuator commands 170 include tip gap adjustment distance 130 determined by tip gap monitoring system 116. Upon receiving inner duct surface actuator commands 170, actuators 164 may move active inner duct surfaces 138 by tip gap adjustment distance 130 so that tip gap 102 is substantially equal to tip gap target 128. In certain embodiments, inner duct surface control module 168 generates inner duct surface actuator commands 170 in response to receiving tip gap adjustment distance 130 from tip gap monitoring system 116. While inner duct surface control module 168 may continuously adjust active inner duct surfaces 138 in real time to match tip gap target 128 by sending tip gap adjustment distance 130 to actuators 164 regardless of magnitude, in other embodiments inner duct surface control module 168 may generate inner duct surface actuator commands 170 in response to tip gap adjustment distance 130 exceeding a tip gap adjustment distance threshold to avoid micro-adjustments below such a threshold. Inner duct surface actuator commands 170 may extend or retract active inner duct surfaces 138 uniformly or may include one or more active inner duct surface-specific actuator commands each corresponding to a respective one of active inner duct surfaces 138 for nonuniform positioning. Thus, inner duct surface control module 168 may extend or retract all or a portion of active inner duct surfaces 138 at any given time. For example, inner duct surface actuator commands 170 may include an active inner duct surface-specific actuator command that retracts only one of active inner duct surfaces 138 if the portion of duct 110 at which the active inner duct surface is disposed has been deformed.

While tip gap control system 134 may actively control tip gap 102 using active inner duct surfaces 138 during all portions of a flight, tip gap control system 134 may also semi-actively control active inner duct surfaces 138. Semi-active control of active inner duct surfaces 138 may be particularly useful in response to events such as bird strikes or severe maneuvers of ducted aircraft 100. In some semi-active implementations, inner duct surface actuator commands 170 may include a retract command or an extend command for duct 110, and actuators 164 may move active inner duct surfaces 138 by a predetermined distance in response to receiving the retract or extend command. For example, inner duct surface control module 168 may send inner duct surface actuator commands 170 that retract active inner duct surfaces 138 by a predetermined distance in response to detecting an actual or imminent collision such as a bird strike with proprotor system 104 during flight. Inner duct surface control module 168 may also generate inner duct surface actuator commands 170 that retract active inner duct surfaces 138 by a predetermined distance in response to tip gap monitoring system 116 detecting a structural deformity of proprotor system 104. In one non-limiting example, active inner duct surfaces 138 may be commanded to retract only if the structural deformity meets or exceeds a structural deformity threshold.

Inner duct surface control module 168 may also generate inner duct surface actuator commands 170 based on the flight condition of ducted aircraft 100. For example, inner duct surface control module 168 may generate inner duct surface actuator commands 170 that retract active inner duct surfaces 138 by a predetermined or calculated distance if ducted aircraft 100 executes a flight maneuver 154, as detected by maneuver detection module 156, which has been predetermined to subject proprotor system 104 to excessive loading. Inner duct surface control module 168 may also generate inner duct surface actuator commands 170 based on the flight mode of ducted aircraft 100. The rotational speed of proprotor system 104 is lower in the forward flight mode than in the VTOL flight mode, which expands tip gap 102 in the forward flight mode. Inner duct surface control module 168 may either supplement or compensate for the naturally higher tip gap 102 in the forward flight mode. Thus, inner duct surface control module 168 may generate inner duct surface actuator commands 170 that move active inner duct surfaces 138 between the retracted and extended positions in response to ducted aircraft 100 converting between the VTOL flight mode and the forward flight mode. For example, inner duct surface control module 168 may generate inner duct surface actuator commands 170 that move active inner duct surfaces 138 by a calculated or predetermined amount from the retracted position to the extended position in response to ducted aircraft 100 converting from the VTOL flight mode to the forward flight mode, thus compensating for the naturally higher tip gap in the forward flight mode. In another example, inner duct surface control module 168 may generate inner duct surface actuator commands 170 that move active inner duct surfaces 138 by a calculated or predetermined amount from the extended position to the retracted position in response to ducted aircraft 100 converting from the VTOL flight mode to the forward flight mode, thus supplementing tip gap 102 to provide additional safety.

Because the blade pitch of proprotor blades 108 changes when converting from the VTOL flight mode to the forward flight mode, inner duct surface control module 168 may also generate inner duct surface actuator commands 170 based on the blade pitch of proprotor blades 108. Because proprotor system 104 typically experiences higher loading in the conversion flight mode, inner duct surface control module 168 may also generate inner duct surface actuator commands 170 that retract active inner duct surfaces 138 by a calculated or predetermined amount when ducted aircraft 100 is in the conversion flight mode between the VTOL flight mode and the forward flight mode. The systems and modules shown as part of flight control computer 114 may be interchangeable with one another. In certain embodiments, flight control computer 114 may include or implement only a portion of the systems and modules shown in FIG. 4 in any combination.

Figure 8G:
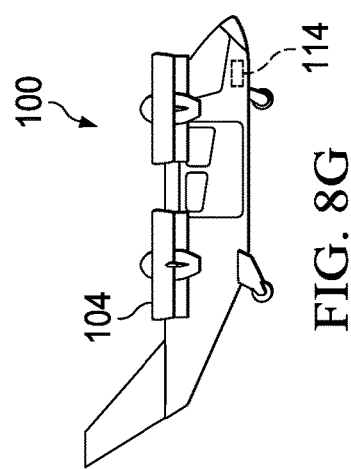

Referring additionally to FIGS. 8A-8H in the drawings, a sequential flight-operating scenario of ducted aircraft 100 including proprotor systems 104 and flight control computer 114 is depicted. Proprotor systems 104 include forward-port, forward-starboard, aft-port and aft-starboard proprotor systems similar to ducted aircraft 10 in FIGS. 1A-1F. As best seen in FIG. 8A, ducted aircraft 100 is positioned on the ground prior to takeoff. When ducted aircraft 100 is ready for a mission, flight control computer 114 commences operations to provide flight control to ducted aircraft 100 which may be onboard pilot flight control, remote flight control, autonomous flight control or a combination thereof. For example, it may be desirable to utilize onboard pilot flight control during certain maneuvers such as takeoff and landing but rely on autonomous flight control during hover, high speed forward flight and/or transitions between wing-borne flight and thrust-borne flight.

As best seen in FIG. 8B, ducted aircraft 100 has performed a vertical takeoff and is engaged in thrust-borne lift. As illustrated, the proprotor assemblies of each proprotor system 104 are rotating in the same horizontal plane forming a two-dimensional distributed thrust array of four proprotor systems. As the longitudinal axis and the lateral axis of ducted aircraft 100 are both in the horizontal plane, ducted aircraft 100 has a level flight attitude. During hover, flight control computer 114 utilizes individual variable speed and blade pitch control capability of proprotor systems 104 to control flight dynamics to maintain hover stability and to provide pitch, roll and yaw authority for ducted aircraft 100. More specifically, as each proprotor system 104 is independently controllable, operational changes to certain proprotor systems 104 enable pitch, roll and yaw control of ducted aircraft 100 during VTOL operations.

For example, by changing the thrust output of the forward proprotor systems relative to the aft proprotor systems, pitch control is achieved. As another example, by changing the thrust output of the port proprotor systems relative to the starboard proprotor systems, roll control is achieved. Changing the relative thrust outputs of the various proprotor systems 104 may be accomplished using differential rotor speed control, that is, increasing the rotor speed of some proprotor systems relative to the rotor speed of other proprotor systems and/or decreasing the rotor speed of some proprotor systems relative to the rotor speed of other proprotor systems. Changing the relative thrust outputs of the various proprotor systems 104 may be accomplished using collective blade pitch. Yaw control or torque balancing of ducted aircraft 100 during VTOL operations may be accomplished by changing the torque output of certain proprotor systems 104. For example, the forward-port and aft-starboard proprotor systems may have clockwise rotating proprotor assemblies while the forward-starboard and aft-port proprotor systems may have counterclockwise rotating proprotor assemblies. In this example, by changing the torque output of the forward-port and aft-starboard proprotor systems relative to the forward-starboard and aft-port proprotor systems, yaw control is achieved. Changing the relative torque outputs of the various proprotor systems 104 may be accomplished using differential rotor speed control.

During hover, ducted aircraft 100 may experience crosswinds that cause turbulent flow through proprotor systems 104. This turbulent flow subjects proprotor systems 104 to deforming loads, which affect tip gap 102. Tip gap monitoring system 116 detects changes to tip gap 102 caused by crosswinds. If tip gap 102 becomes unacceptably small due to the resulting deforming loads, tip gap control system 134 repositions active blade tips 136 and/or active inner duct surfaces 138 to enlarge tip gap 102.

Returning to the sequential flight-operating scenario of ducted aircraft 100, after vertical ascent to the desired elevation, ducted aircraft 100 may begin the transition from thrust-borne lift to wing-borne lift. As best seen from the progression of FIGS. 8B-8D, the angular positions of proprotor systems 104 are changed by a pitch down rotation to transition ducted aircraft 100 from the VTOL flight mode toward the forward flight mode. As seen in FIG. 8C, proprotor systems 104 have been collectively inclined about 45 degrees pitch down. In the conversion orientations of ducted aircraft 100, a portion of the thrust generated by proprotor systems 104 provides lift while a portion of the thrust generated by proprotor systems 104 urges ducted aircraft 100 to accelerate in the forward direction such that the forward airspeed of ducted aircraft 100 increases allowing the wings of ducted aircraft 100 to offload a portion and eventually all of the lift requirement from proprotor systems 104. Proprotor systems 104 may be particularly susceptible to deforming loads in the conversion flight mode shown in FIG. 8C. Tip gap monitoring system 116 detects any structural deformities to proprotor systems 104 during the transition from the VTOL flight mode to the forward flight mode. Tip gap control system 134 repositions active blade tips 136 and/or active inner duct surfaces 138 in response to any structural deformities that unacceptably reduce tip gap 102 during the conversion flight mode to ensure that no collisions occur between proprotor blades 108 and duct 110.

Figure 8H:
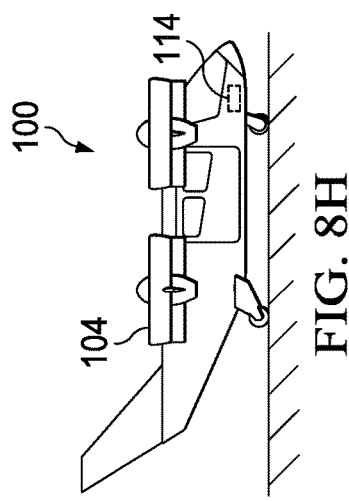
Figure 8F:
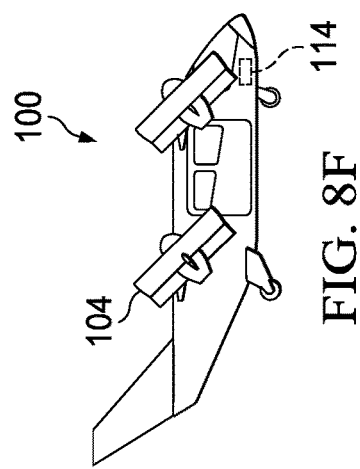
Figure 8E:
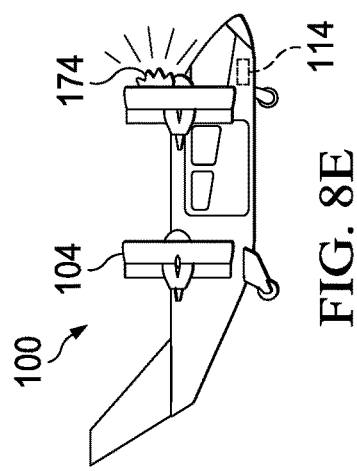

As best seen in FIGS. 8D-8E, proprotor systems 104 have been collectively inclined about 90 degrees pitch down such that the proprotor assemblies are rotating in vertical planes providing forward thrust for ducted aircraft 100 while the wings provide lift. Even though the conversion from the VTOL flight mode to the forward flight mode of ducted aircraft 100 has been described as progressing with collective pitch down rotation of proprotor systems 104, in other implementations, all proprotor systems 104 need not be operated at the same time or at the same rate. As forward flight with wing-borne lift requires significantly less thrust than VTOL flight with thrust-borne lift, the operating speed of some or all of proprotor systems 104 may be reduced particularly in embodiments having collective pitch control. This RPM reduction in the forward flight mode tends to increase tip gap 102. Tip gap control system 134 may decrease tip gap 102 in the forward flight mode by extending active blade tips 136 and/or active inner duct surfaces 138 to compensate for the enlarged tip gap 102. In other embodiments, tip gap control system 134 may further increase tip gap 102 in the forward flight mode by retracting active blade tips 136 and/or active inner duct surfaces 138 since tip gap 102 may be less critical to flight efficiency in the forward flight mode than in the VTOL flight mode. Tip gap control system 134 may increase or decrease tip gap 102 in response to flight control computer 114 signaling a change in flight mode. Because the blade pitch of proprotor blades 108 changes when converting from the VTOL flight mode to the forward flight mode, tip gap control system 134 may also increase or decrease tip gap 102 in response to flight control computer 114 or sensors 118 signaling a change in blade pitch. Proprotor systems 104 are susceptible to collisions such as a collision 174 with a bird 176. Such collisions can cause proprotor systems 104 to structurally deform. Tip gap monitoring system 116 detects any structural deformities to proprotor systems 104 caused by actual or imminent collisions during flight. Tip gap control system 134 repositions active blade tips 136 and/or active inner duct surfaces 138 in response to any structural deformities caused by collision 174 that unacceptably reduce tip gap 102.

In certain embodiments, some of proprotor systems 104 of ducted aircraft 100 could be shut down during forward flight. In the forward flight mode, the independent rotor speed control provided by flight control computer 114 over each proprotor system 104 may provide yaw authority for ducted aircraft 100. For example, by changing the thrust output of either or both port proprotor systems relative to starboard proprotor systems, yaw control is achieved. Changing the relative thrust outputs of the various proprotor systems 104 may be accomplished using differential rotor speed control. Changing the relative thrust outputs of the various proprotor systems 104 may also be accomplished using collective pitch control. In the forward flight mode, pitch and roll authority is preferably provided by the ailerons and/or elevators on the wings and/or tail assembly of ducted aircraft 100.

As ducted aircraft 100 approaches its destination, ducted aircraft 100 may begin its transition from wing-borne lift to thrust-borne lift. As best seen from the progression of FIGS. 8E-8G, the angular positions of proprotor systems 104 are changed by a pitch up rotation to transition ducted aircraft 100 from the forward flight mode toward the VTOL flight mode. As seen in FIG. 8F, proprotor systems 104 have been collectively inclined about 45 degrees pitch up. In the conversion orientations of ducted aircraft 100, a portion of the thrust generated by proprotor systems 104 begins to provide lift for ducted aircraft 100 as the forward airspeed decreases and the lift producing capability of the wings of ducted aircraft 100 decreases. As best seen in FIG. 8G, proprotor systems 104 have been collectively inclined about 90 degrees pitch up such that the proprotor assemblies are rotating in the horizontal plane providing thrust-borne lift for ducted aircraft 100. Even though the conversion from the forward flight mode to the VTOL flight mode of ducted aircraft 100 has been described as progressing with collective pitch up rotation of proprotor systems 104, in other implementations, all proprotor systems 104 need not be operated at the same time or at the same rate. Once ducted aircraft 100 has completed the transition to the VTOL flight mode, ducted aircraft 100 may commence its vertical descent to a surface. As best seen in FIG. 8H, ducted aircraft 100 has landed at the destination location.

Referring to FIGS. 9A-9C in the drawings, methods for monitoring and controlling a tip gap for a ducted aircraft are illustrated as flowcharts 200, 202, 204. In FIG. 9A, a method for monitoring a tip gap for a ducted aircraft includes detecting one or more parameters of a proprotor system including a duct and a plurality of proprotor blades to form a plurality of sensor measurements (step 206). The method includes transmitting the sensor measurements from a plurality of sensors coupled to the proprotor system to a flight control computer (step 208). The method includes determining a tip gap distance based on the sensor measurements (step 210). The method also includes determining a tip gap adjustment distance based on the tip gap distance and a tip gap target (step 212).

In FIG. 9B, a method for controlling a tip gap for a ducted aircraft includes generating a blade tip actuator command (step 214). The method includes transmitting the blade tip actuator command to a proprotor system including a duct and a plurality of proprotor blades, the proprotor blades including active blade tips (step 216). The method also includes moving at least one of the active blade tips between a retracted position and an extended position in response to the blade tip actuator command, thereby controlling the tip gap between the proprotor blades and the duct (step 218). In FIG. 9C, a method for controlling a tip gap for a ducted aircraft includes generating an inner duct surface actuator command (step 220). The method includes transmitting the inner duct surface actuator command to a proprotor system including a duct and a plurality of proprotor blades, the duct including a plurality of active inner duct surfaces (step 222). The method also includes moving at least one of the active inner duct surfaces between a retracted position and an extended position in response to the inner duct surface actuator command, thereby controlling the tip gap between the proprotor blades and the duct (step 224).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Figure 10A:
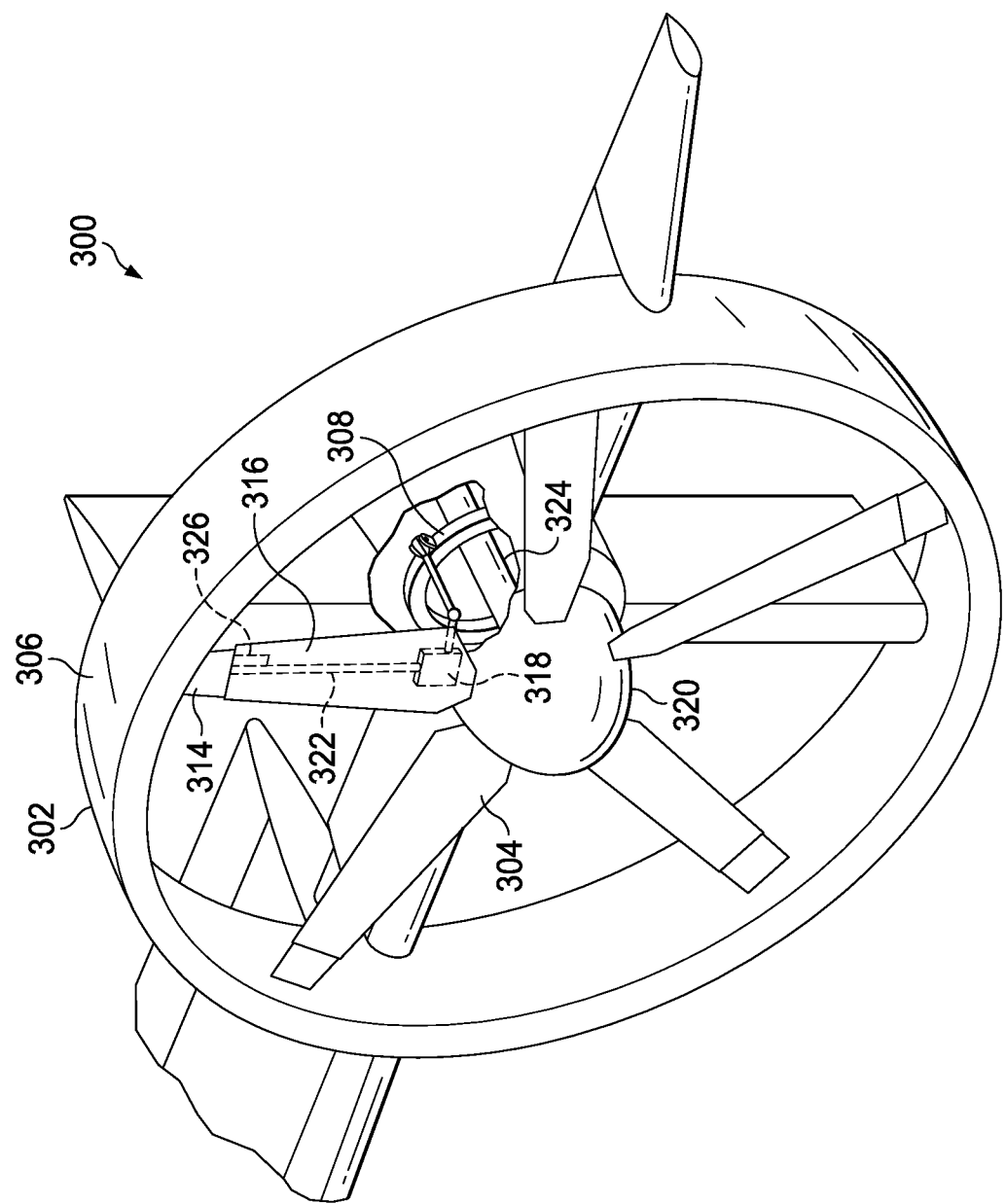

Referring to FIGS. 10A-10E in the drawings, a ducted aircraft implementing a passive tip gap control system is schematically illustrated and generally designated 300. Proprotor system 302 is one of a plurality of proprotor systems of ducted aircraft 300. Similar to ducted aircraft 10 in FIGS. 1A-1F, the proprotor systems of ducted aircraft 300 including proprotor system 302 are rotatable between the vertical orientation of the forward flight mode shown in FIGS. 10A-10C and the horizontal orientation of the VTOL flight mode shown in FIGS. 10D-10E. Proprotor system 302 includes proprotor blades 304 surrounded by duct 306. A pitch control assembly 308 is coupled to proprotor blades 304 to change the collective pitch of proprotor blades 304 about pitch change axis 310. Ducted aircraft 300 relies on thrust-borne lift in the VTOL flight mode and wing-borne lift in the forward flight mode. Proprotor blades 304 have a lower collective pitch in the VTOL flight mode as shown in FIGS. 10D-10E than in the forward flight mode as shown in FIGS. 10B-10C. In addition, proprotor blades 304 operate at two different rotational speeds in the two primary flight modes of ducted aircraft 300. More particularly, proprotor system 302 has a higher rotational speed in the VTOL flight mode than the forward flight mode. Due to a decrease in centrifugal force as well as other factors, the lower rotational speed of proprotor system 302 in the forward flight mode increases tip gap 312 in the forward flight mode relative to tip gap 312 in the VTOL flight mode. The passive tip gap control system of ducted aircraft 300 passively ties the length of proprotor blades 304 to the blade pitch of proprotor blades 304 to accentuate or compensate for increased tip gap 312 in the forward flight mode.

Proprotor blades 304 are extendable along pitch change axis 310 into a plurality of positions including the extended position shown in FIGS. 10B-10C and the retracted position shown in FIGS. 10D-10E as well as an infinite number of intermediate positions therebetween. More particularly, each proprotor blade 304 includes a blade tip extension 314 extendable into the extended position shown in FIGS. 10B-10C and retractable into the retracted position shown in FIGS. 10D-10E. Blade tip extensions 314 are slidably, or telescopically, coupled to the open distal ends of main bodies 316 of proprotor blades 304. Blade tip extensions 314 are retracted into main bodies 316 of proprotor blades 304 in the retracted position and extended from the open distal ends of main bodies 316 of proprotor blades 304 in the extended position, thereby increasing tip gap 312 in the retracted position and decreasing tip gap 312 in the extended position.

Each blade tip extension 314 is associated with a respective pitch-span converter 318. Each pitch-span converter 318 is coupled to and interposed between pitch control assembly 308 and a respective blade tip extension 314. Pitch-span converters 318 are located at proprotor hub 320 of proprotor system 302, although pitch-span converters 318 may be located anywhere on proprotor system 302 including within main bodies 316 of proprotor blades 304. Each pitch-span converter 318 is coupled to a respective blade tip extension 314 by a spanwise link 322 such as a cable or rod disposed inside a respective proprotor blade 304. Pitch-span converters 318 convert the collective pitch of proprotor blades 304 about pitch change axis 310 into the position of blade tip extensions 314 along pitch change axis 310. In some embodiments, each pitch-span converter 318 may include a screw mechanism such as a helical threaded screw or a pulley to convert the axial motion of pitch control assembly 308 along mast 324 into the spanwise and radially extendable motion of blade tip extensions 314. In embodiments in which each spanwise link 322 is a cable, the cable may pull a respective blade tip extension 314 into the retracted position against the bias of a respective spring 326 and/or centrifugal force during operation. Centrifugal force during operation may supplement or replace the need for spring 326, in which case spring 326 may be useful to keep the system in tension when proprotor system 302 is not in operation. In alternative embodiments, blade tip extensions 314 may instead be hingeably coupled to the distal ends of main bodies 316 of proprotor blades 304 in a similar manner to that described for active blade tips 136b in FIGS. 6E-6G. In such alternative embodiments, blade tip extensions 314 are substantially coplanar with main bodies 316 of proprotor blades 304 in the extended position and form an angle of less than 180 degrees with main bodies 316 of proprotor blades 304 in the retracted position, thereby increasing tip gap 312 in the retracted position and decreasing tip gap 312 in the extended position.

Blade tip extensions 314 change between the extended position of FIGS. 10B-10C and the retracted position of FIGS. 10D-10E based on the collective pitch of proprotor blades 304 to control tip gap 312. As described above, proprotor blades 304 have a lower collective pitch in the VTOL flight mode and a higher collective pitch in the forward flight mode. Thus, blade tip extensions 314 change between the retracted position and the extended position based on the flight mode of ducted aircraft 300. FIGS. 10D-10E show proprotor system 302 in the VTOL flight mode, in which proprotor blades 304 have a lower collective pitch and blade tip extensions 314 are in the retracted position. FIGS. 10B-10C show proprotor system 302 in the forward flight mode, in which proprotor blades 304 have a higher collective pitch and blade tip extensions 314 are in the extended position to compensate for the shortened span of main bodies 316 of proprotor blades 304 in the forward flight mode. Thus, tip gap 312 remains substantially the same in both flight modes. Alternatively, blade tip extensions 314 may extend at the lower collective pitch in the VTOL flight mode and retract at the higher collective pitch of the forward flight mode to increase tip gap 312 in the forward flight mode. Increasing tip gap 312 in this manner may be useful because tip gap 312 is not as critical to performance in the forward flight mode. Increasing tip gap 312 in the forward flight mode may also be used as a safety measure to guard against large deformations of duct 306 due to bird strikes or other collisions, which are more likely to occur and incur more damage in the forward flight mode.

Figure 11D:
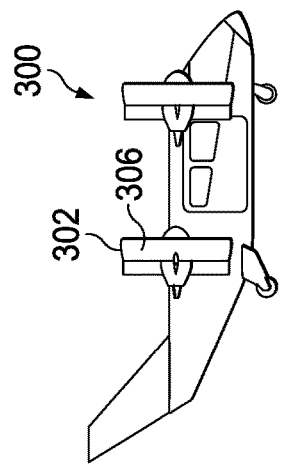
FIGS. 11A-11H are schematic illustrations of a ducted aircraft having a passive tip gap control system in a sequential flight operating scenario in accordance with embodiments of the present disclosure.
Figure 11C:
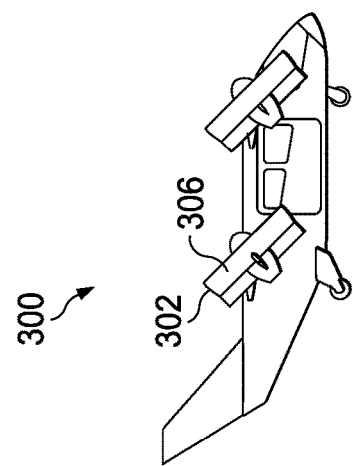
Figure 11B:
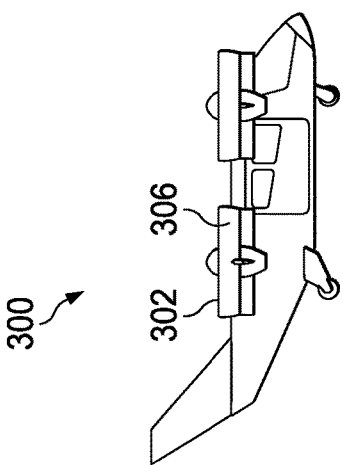
Figure 11A:
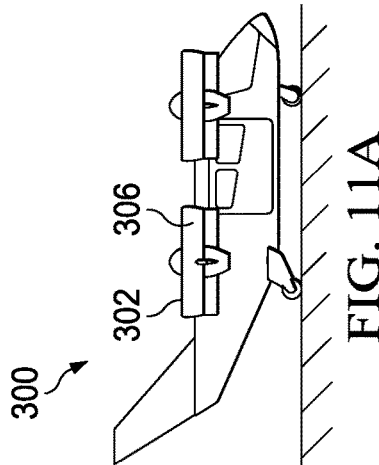

Referring additionally to FIGS. 11A-11H in the drawings, a sequential flight-operating scenario of ducted aircraft 300 including proprotor systems 302 is depicted. Proprotor systems 302 include forward-port, forward-starboard, aft-port and aft-starboard proprotor systems similar to ducted aircraft 10 in FIGS. 1A-1F. As best seen in FIG. 11A, ducted aircraft 300 is positioned on the ground prior to takeoff. When ducted aircraft 300 is ready for a mission, the flight control computer commences operations to provide flight control to ducted aircraft 300 which may be onboard pilot flight control, remote flight control, autonomous flight control or a combination thereof. For example, it may be desirable to utilize onboard pilot flight control during certain maneuvers such as takeoff and landing but rely on autonomous flight control during hover, high speed forward flight and/or transitions between wing-borne flight and thrust-borne flight.

As best seen in FIG. 11B, ducted aircraft 300 has performed a vertical takeoff and is engaged in thrust-borne lift. As illustrated, the proprotor assemblies of each proprotor system 302 are rotating in the same horizontal plane forming a two-dimensional distributed thrust array of four proprotor systems. As the longitudinal axis and the lateral axis of ducted aircraft 300 are both in the horizontal plane, ducted aircraft 300 has a level flight attitude. During hover, the flight control computer utilizes individual variable speed and blade pitch control capability of proprotor systems 302 to control flight dynamics to maintain hover stability and to provide pitch, roll and yaw authority for ducted aircraft 300. More specifically, as each proprotor system 302 is independently controllable, operational changes to certain proprotor systems 302 enable pitch, roll and yaw control of ducted aircraft 300 during VTOL operations.

Figure 11E:
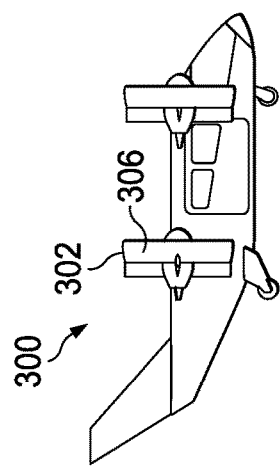

Returning to the sequential flight-operating scenario of ducted aircraft 300, after vertical assent to the desired elevation, ducted aircraft 300 may begin the transition from thrust-borne lift to wing-borne lift. As best seen from the progression of FIGS. 11B-11D, the angular positions of proprotor systems 302 are changed by a pitch down rotation to transition ducted aircraft 300 from the VTOL flight mode toward the forward flight mode. As seen in FIG. 11C, proprotor systems 302 have been collectively inclined about 45 degrees pitch down. In the conversion flight mode of ducted aircraft 300, a portion of the thrust generated by proprotor systems 302 provides lift while a portion of the thrust generated by proprotor systems 302 urges ducted aircraft 300 to accelerate in the forward direction such that the forward airspeed of ducted aircraft 300 increases allowing the wings of ducted aircraft 300 to offload a portion and eventually all of the lift requirement from proprotor systems 302. As best seen in FIGS. 11D-11E, proprotor systems 302 have been collectively inclined about 90 degrees pitch down such that the proprotor assemblies are rotating in vertical planes providing forward thrust for ducted aircraft 300 while the wings provide lift.

Proprotor systems 302 are designed to have a minimum tip gap 312 in the VTOL flight mode to maximize duct performance. As ducted aircraft 300 transitions from the VTOL flight mode in FIG. 11B to the forward flight mode in FIG. 11D, the collective pitch of proprotor blades 304 increases and the RPMs of proprotor systems 302 decrease, thereby enlarging tip gap 312 in the forward flight mode. The passive tip gap control system extends blade tip extensions 314 as the collective pitch of proprotor blades 304 increases into the forward flight mode to compensate for this enlarged tip gap 312. In other embodiments, the passive tip gap control system may retract blade tip extensions 314 as the collective pitch of proprotor blades 304 increases into the forward flight mode to provide additional safety since tip gap 312 is less critical for performance in the forward flight mode.

Figure 11F:
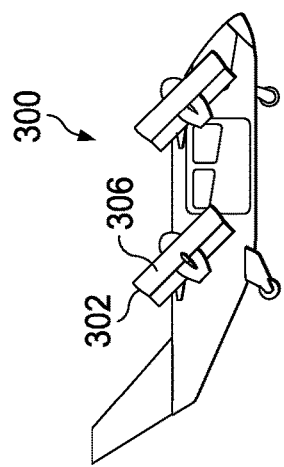
Figure 11G:
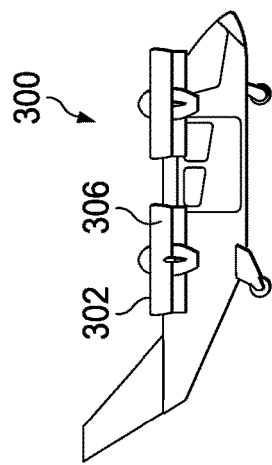
Figure 11H:
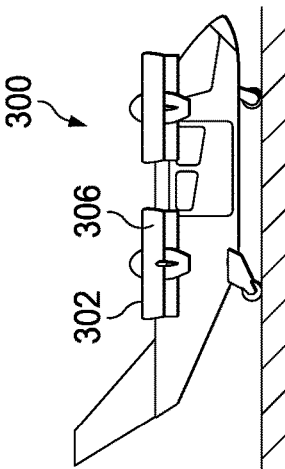

As ducted aircraft 300 approaches its destination, ducted aircraft 300 may begin its transition from wing-borne lift to thrust-borne lift. As best seen from the progression of FIGS. 11E-11G, the angular positions of proprotor systems 302 are changed by a pitch up rotation to transition ducted aircraft 300 from the forward flight mode to the VTOL flight mode. As seen in FIG. 11F, proprotor systems 302 have been collectively inclined about 45 degrees pitch up. In the conversion orientations of ducted aircraft 300, a portion of the thrust generated by proprotor systems 302 begins to provide lift for ducted aircraft 300 as the forward airspeed decreases and the lift producing capability of the wings of ducted aircraft 300 decreases. As best seen in FIG. 11G, proprotor systems 302 have been collectively inclined about 90 degrees pitch up such that the proprotor assemblies are rotating in the horizontal plane providing thrust-borne lift for ducted aircraft 300. As ducted aircraft 300 transitions from the forward flight mode in FIG. 11E to the VTOL flight mode in FIG. 11G, the collective pitch of proprotor blades 304 decreases and the RPMs of proprotor systems 302 increase, thereby constricting tip gap 312 in the VTOL flight mode. The passive tip gap control system retracts blade tip extensions 314 as the collective pitch of proprotor blades 304 decreases into the VTOL flight mode to avoid any collisions between proprotor blades 304 and duct 306. In other embodiments, the passive tip gap control system may extend blade tip extensions 314 as the collective pitch of proprotor blades 304 decreases into the VTOL flight mode to improve the performance of duct 306. Even though the conversion from the forward flight mode to the VTOL flight mode of ducted aircraft 300 has been described as progressing with collective pitch up rotation of proprotor systems 302, in other implementations, all proprotor systems 302 need not be operated at the same time or at the same rate. Once ducted aircraft 300 has completed the transition to the VTOL flight mode, ducted aircraft 300 may commence its vertical descent to a surface. As best seen in FIG. 11H, ducted aircraft 300 has landed at the destination location.

Figure 12C:
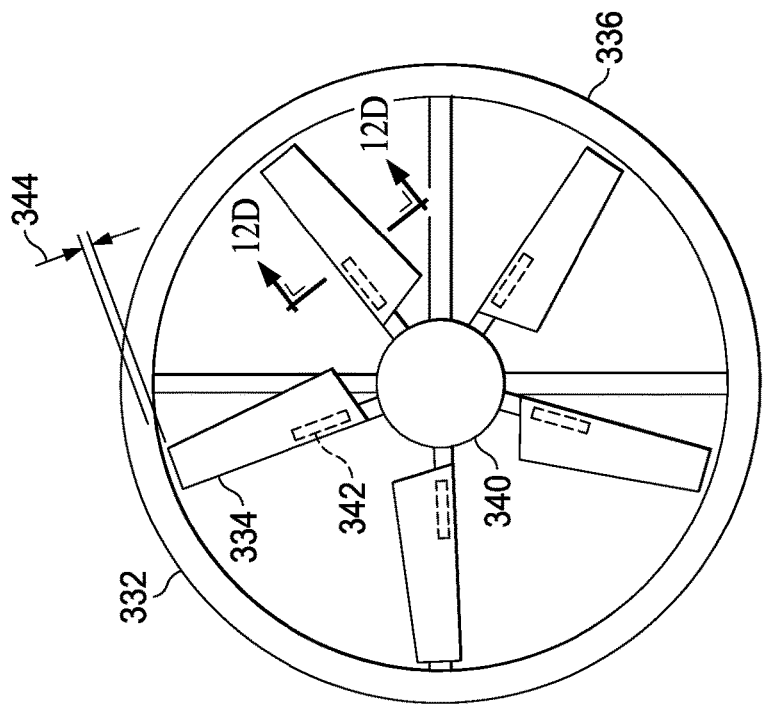
FIGS. 12A-12F are various views of a passive tip gap control system for a ducted aircraft utilizing tension-torsion straps in accordance with embodiments of the present disclosure.
Figure 12D:
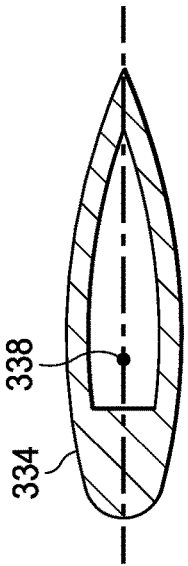
Figure 12A:
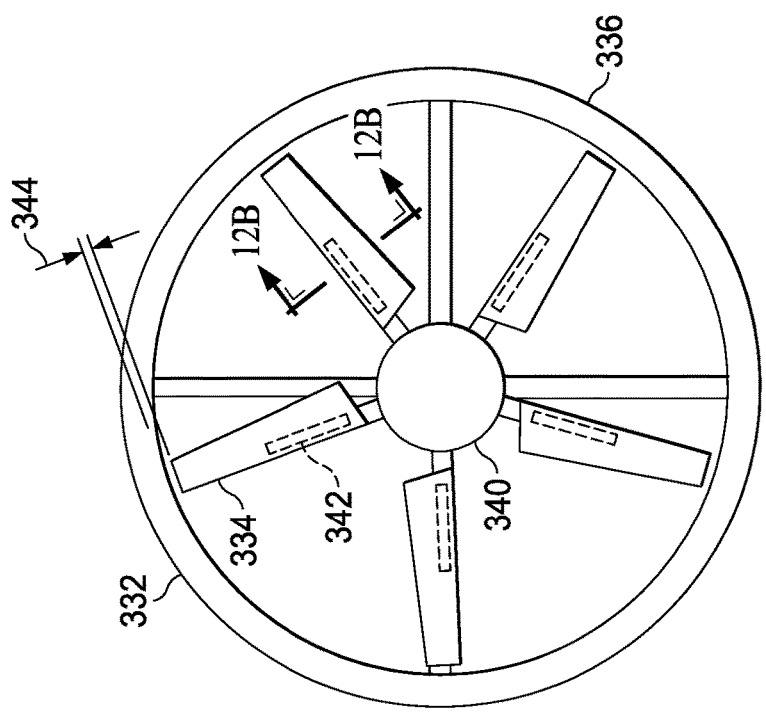
Figure 12B:
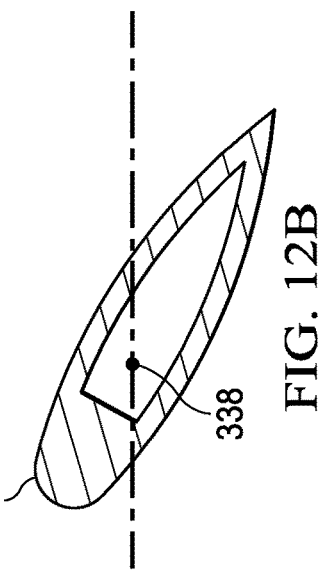
Figure 12E:
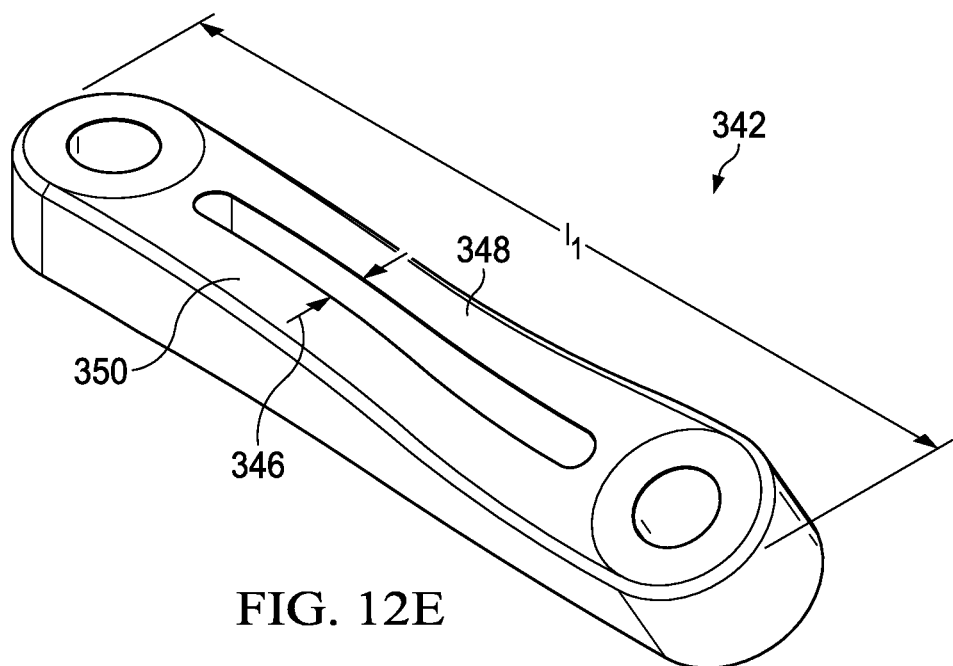
Figure 12F:
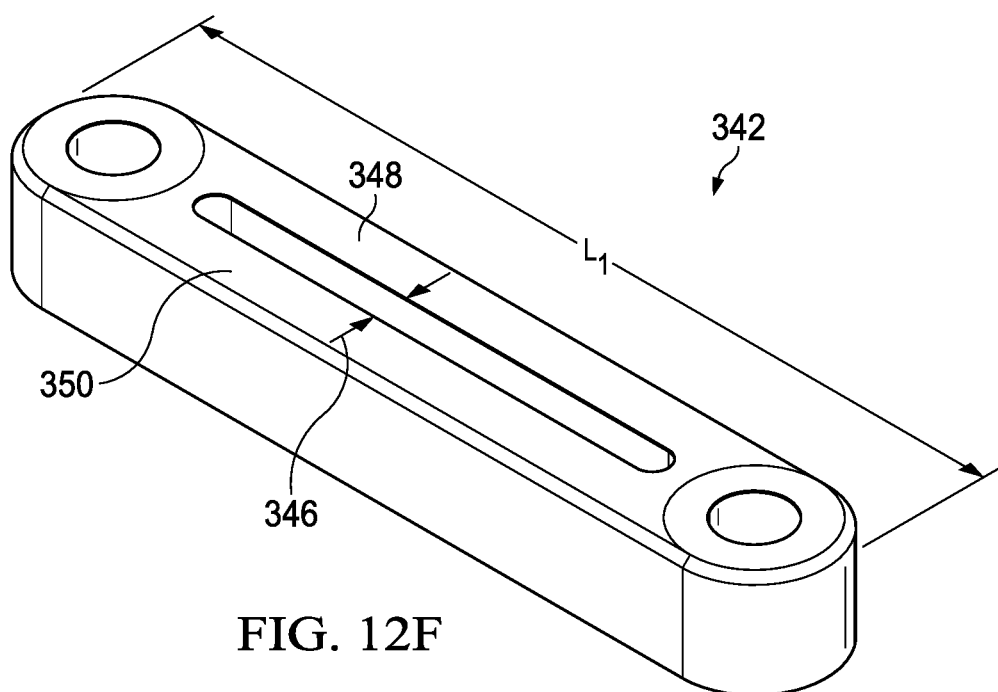

Referring to FIGS. 12A-12F in the drawings, a passive tip gap control system for proprotor system 332 including proprotor blades 334 surrounded by duct 336 is schematically illustrated. Proprotor blades 334 change collective pitch about pitch change axis 338. FIGS. 12A-12B show proprotor blades 334 having a higher collective pitch in the forward flight mode while FIGS. 12C-12D show proprotor blades 334 having a lower collective pitch in the VTOL flight mode. Proprotor blades 334 are retained on proprotor hub 340 by tension-torsion straps 342. Tension-torsion straps 342 may be partially or fully disposed inside of proprotor blades 334. Tension-torsion straps 342 may extend from proprotor hub 340 for any spanwise length along proprotor blades 334 such as 10 percent, 20 percent, 30 percent, 40 percent or higher of the spanwise length of proprotor blades 334. In some embodiments, tension-torsion straps 342 may also be used to couple a proprotor blade 334 to other proprotor blades 334. In addition to reacting centrifugal force during the operation of proprotor system 332, tension-torsion straps 342 twist and untwist to extend proprotor blades 334 at the higher collective pitch in the forward flight mode as shown in FIGS. 12A-12B and retract proprotor blades 334 at the lower collective pitch in the VTOL flight mode as shown in FIGS. 12C-12D. Each tension-torsion strap 342 changes between the wound position shown in FIG. 12E and the unwound position shown in FIG. 12F based on the collective pitch of proprotor blades 334. The lengths $l_1$ of tension-torsion straps 342 are less in the wound position than the lengths $L_1$ of tension-torsion straps 342 in the unwound position. Thus, proprotor blades 334 are in the retracted position when tension-torsion straps 342 are in the wound position as shown in FIG. 12C and in the extended position when tension-torsion straps 342 are in the unwound position as shown in FIG. 12A.

Because proprotor system 332 has a slower rotational speed in the forward flight mode shown in FIG. 12A, unwinding tension-torsion straps 342 at the higher collective pitch extends proprotor blades 334 to compensate for shorter proprotor blades 334 at lower RPMs, thereby maintaining an approximately constant tip gap 344 in both flight modes. In other embodiments, tension-torsion straps 342 may be wound at the higher collective pitch in the forward flight mode and unwound at the lower collective pitch in the VTOL flight mode to further retract proprotor blades 334 in the forward flight mode to provide an additional safety buffer between proprotor blades 334 and duct 336. The spanwise distance that tension-torsion straps 342 extend and retract proprotor blades 334 may depend on various properties of tension-torsion straps 342 such as distance 346 between bands 348, 350, the thickness of bands 348, 350, the material from which tension-torsion straps 342 are formed and the overall length $L_1$ of tension-torsion straps 342. These characteristics of tension-torsion straps 342 may be varied to achieve the desired behavior of tip gap 344 in the various flight modes of the ducted aircraft. In alternative embodiments, tension-torsion straps 342 may instead be helical threaded screws or hydraulic pistons that radially extend and retract proprotor blades 334. In yet other embodiments, the passive tip gap control system described herein may extend and retract proprotor blades 334 based on the cyclic pitch of proprotor blades 334.

Figure 13A:
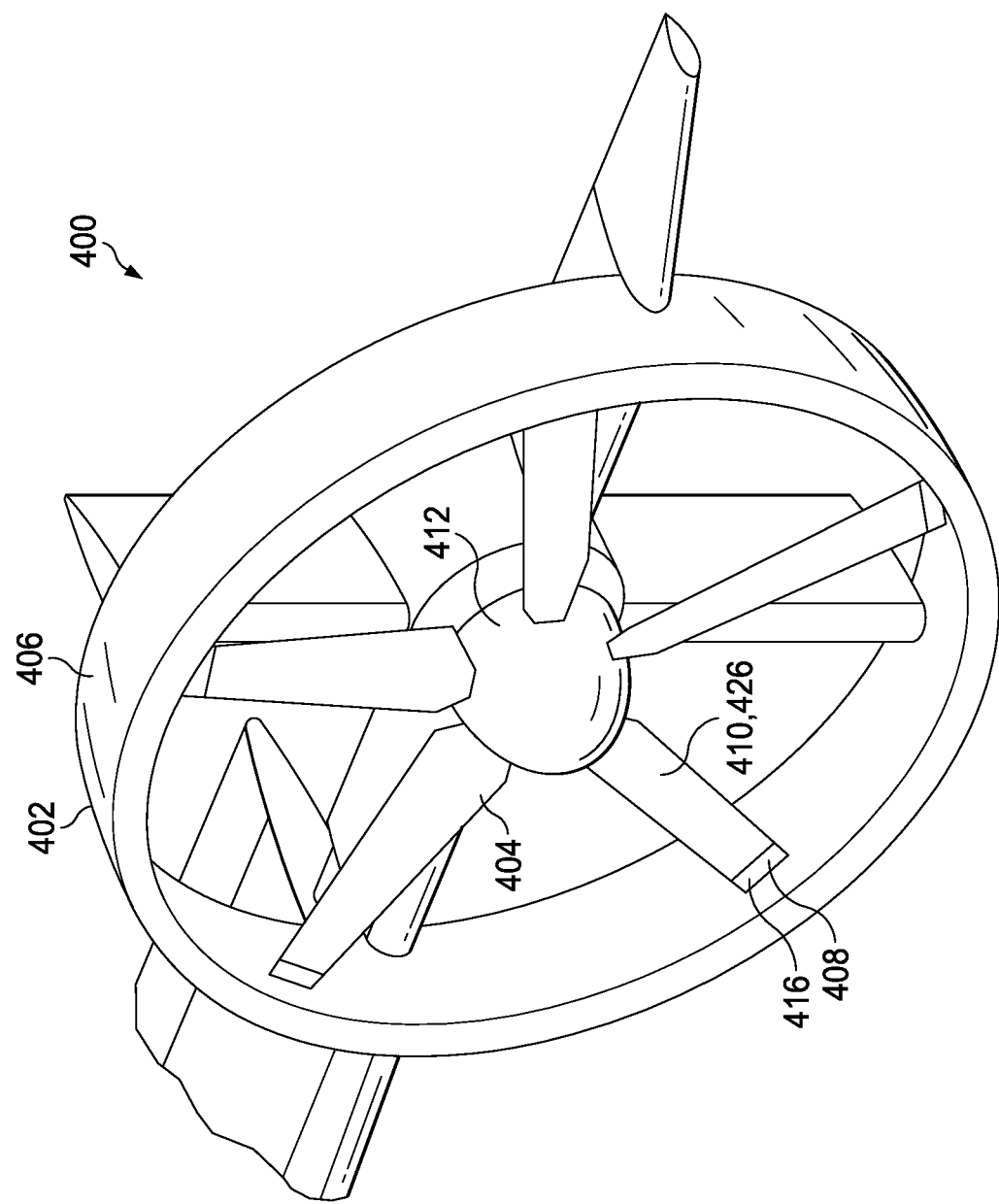
FIGS. 13A-13E are various views of a proprotor system having sacrificial blade tips in accordance with embodiments of the present disclosure.
Figure 13D:
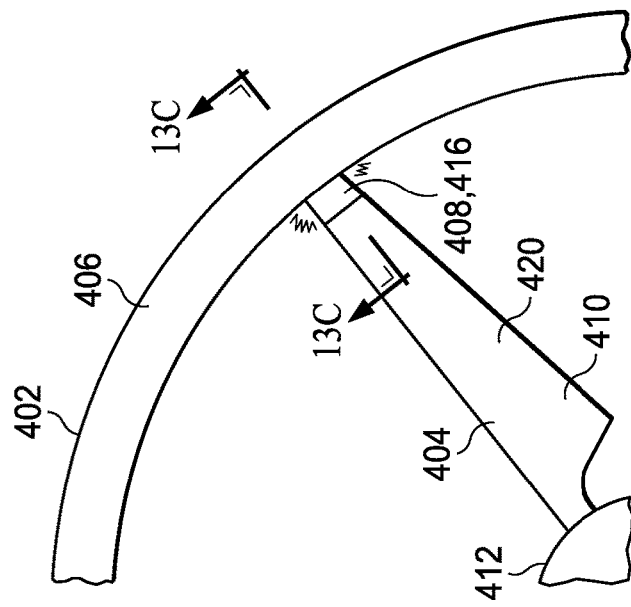
Figure 13B:
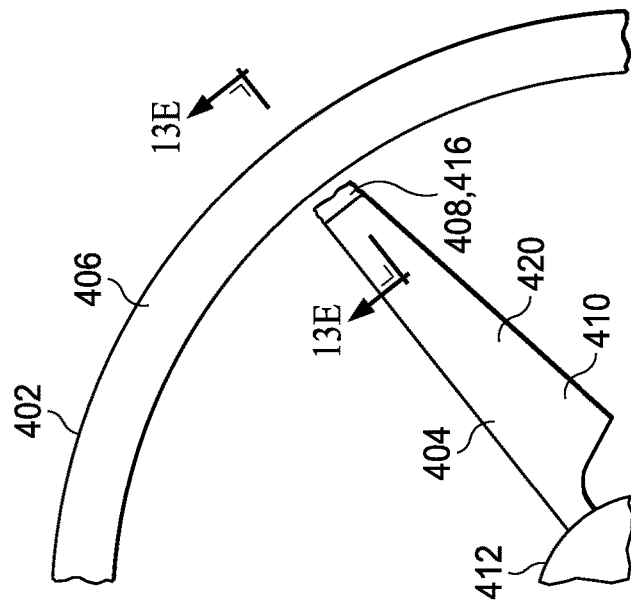
Figure 13E:
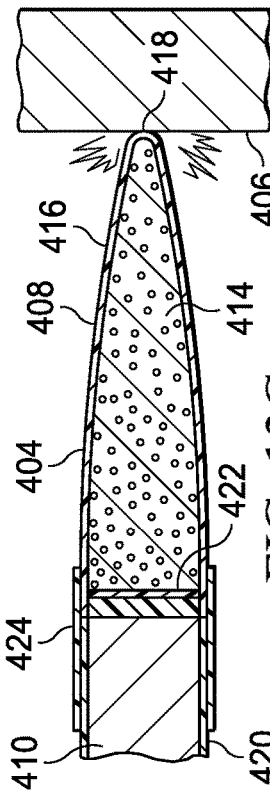
Figure 13C:
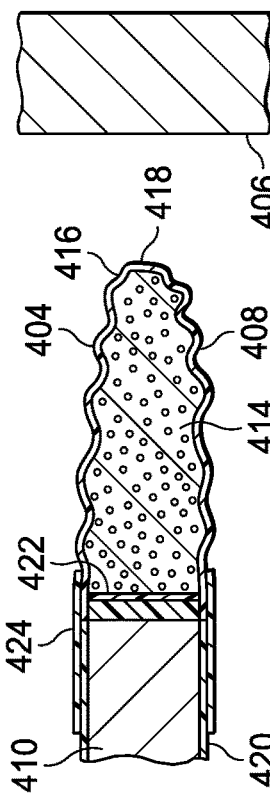

Referring to FIGS. 13A-13E in the drawings, a ducted aircraft 400 including proprotor system 402 having proprotor blades 404 surrounded by duct 406 is schematically illustrated. Proprotor system 402 may be one of a plurality of proprotor systems of ducted aircraft 400 that moves between vertical and horizontal orientations in forward flight and VTOL flight modes similar to ducted aircraft 10 described in FIGS. 1A-1F. For flight conditions such as flight maneuvers or flight modes in which duct 406 deforms due to flight loads, proprotor blades 404 could potentially come in contact with duct 406 as shown in FIGS. 13B-13C, potentially leading to a critical safety issue such as the failure of proprotor blades 404 or duct 406. To remedy this issue, proprotor blades 404 include sacrificial blade tips 408 to allow the tips of proprotor blades 404 to act as sacrificial portions of proprotor blades 404 to save duct 406 and/or main bodies 410 of proprotor blades 404 from damage or failure. The root ends of main bodies 410 of proprotor blades 404 are coupled to proprotor hub 412 and sacrificial blade tips 408 are coupled to the distal ends of main bodies 410 of proprotor blades 404.

Sacrificial blade tips 408 each include a deformable core material 414 and a shell layer 416 covering deformable core material 414. Shell layer 416 has an airfoil cross-sectional shape and a closed distal end 418. In other embodiments, distal end 418 of shell layer 416 may be an open distal end to expose deformable core material 414. Shell layer 416 provides wear resistance during high speed rotation of proprotor blades 404 and general stiffness during flight, but is soft enough to deform or break away in the event of an impact between proprotor blades 404 and duct 406. Non-limiting examples of materials from which shell layer 416 may be formed include fiberglass, fiberglass with spanwise aligned strands, crumble-prone ceramic material, carbon-based material, sheet metal, composite material, thin material, carbon fiber reinforced plastic or frangible ceramic material. Deformable core material 414 is formed from a softer material than shell layer 416. For example, deformable core material 414 may be formed from foam. Shell layer 416 abuts, overlaps or is adjacent to skin 420 of main body 410 as best seen in FIG. 13C. Sacrificial blade tip 408 is coupled to main body 410 using adhesive 422 such as glue on a backing plate as well as adhesive tape 424 at the outer interface boundary between shell layer 416 and skin 420 of main body 410. Sacrificial blade tip 408 may be coupled to the backing plate using hooks, fasteners, tabs, adhesive or other coupling techniques.

FIGS. 13B-13C show the moment of contact between proprotor blades 404 and duct 406. Such contact may occur, for example, upon deformation of proprotor blades 404 and/or duct 406. The structure and material composition of sacrificial blade tips 408 allow sacrificial blade tips 408 to crumble, compress, crush or otherwise deform upon contact with duct 406. The aftermath of contact between sacrificial blade tips 408 and duct 406 is shown in FIGS. 13D-13E, in which main bodies 410 of proprotor blades 404 remain undeformed upon contact between sacrificial blade tips 408 and duct 406. The tip gap between proprotor blades 404 and duct 406 is also increased upon the deformation of sacrificial blade tips 408 to allow the uninterrupted functioning of ducted aircraft 400 for continued operation or an emergency landing. Sacrificial blade tips 408 may be designed to be inexpensive and lightweight, and may be economically replaced when ducted aircraft 400 returns from a mission. Sacrificial blade tips 408 may be designed for one-time use in that they are replaced, as opposed to repaired, when they deform as a result of contact with duct 406.

Figure 14C:
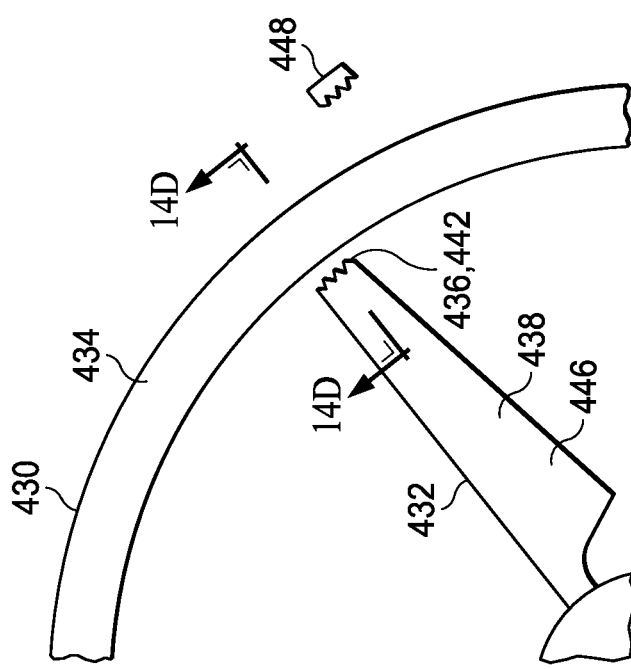
FIGS. 14A-14D are various views of a proprotor system having sacrificial blade tips including a frangible lattice structure in accordance with embodiments of the present disclosure.
Figure 14D:
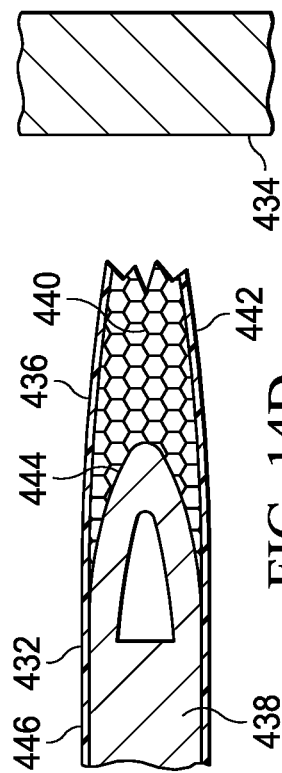
Figure 14A:
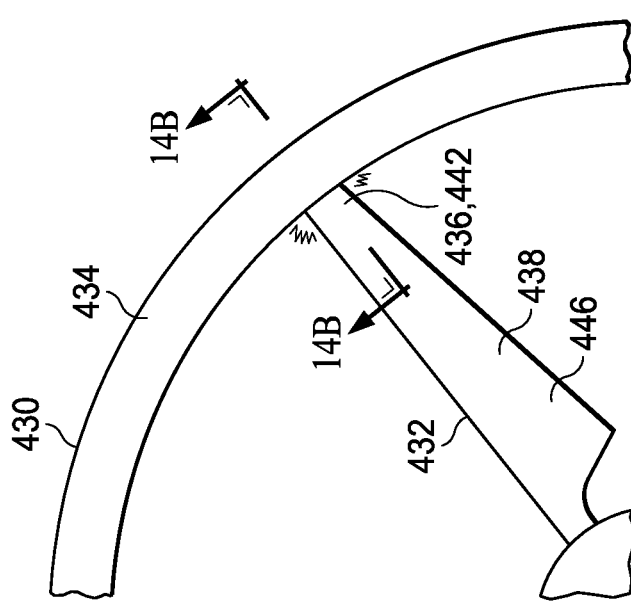
Figure 14B:
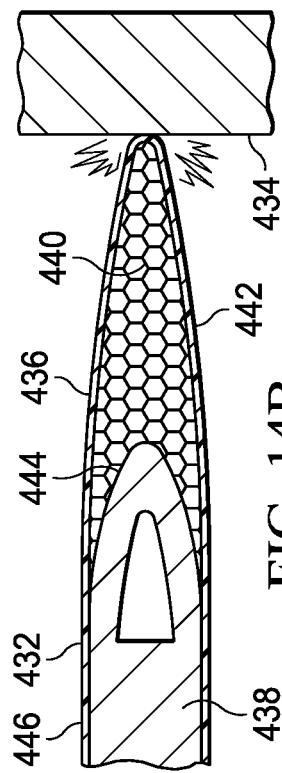

Referring to FIGS. 14A-14D in the drawings, a proprotor system 430 having proprotor blades 432 surrounded by duct 434 is schematically illustrated. Proprotor blade 432 includes sacrificial blade tip 436 coupled to the distal end of main body 438. Sacrificial blade tip 436 includes deformable core material 440 covered by shell layer 442. Sacrificial blade tip 436 is coupled to main body 438 of proprotor blade 432 at an interface boundary 444. Interface boundary 444 is illustrated as having a rounded distal end but may be squared off in other embodiments as shown in FIGS. 13C and 13D. In the illustrated embodiment, shell layer 442 is integral with skin 446 of main body 438 to form an integral layer covering interface boundary 444. Shell layer 442 also has a closed distal end. Deformable core material 440 forms a lattice structure made from polymer or another frangible material. In the illustrated embodiment, the lattice structure formed by deformable core material 440 is a honeycomb structure, although other lattice infill shapes such as triangular, grid or irregular lattices may also be formed by deformable core material 440. When sacrificial blade tip 436 contacts duct 434 as shown in FIGS. 14A-14B, a fragment 448 of sacrificial blade tip 436 breaks away, leaving a slightly shorter proprotor blade. In other embodiments, sacrificial blade tip 436 may separate from main body 438 at interface boundary 444 upon contact with duct 434. The breaking away of fragment 448 enlarges the tip gap between proprotor blade 432 and duct 434 to prevent further damage to these components.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A tip gap monitoring and control system for a ducted aircraft having a vertical takeoff and landing flight mode and a forward flight mode, the tip gap monitoring and control system comprising:
- a flight control computer comprising:
- a tip gap monitoring system including one or more sensors; and
- a blade length control module configured to generate a blade tip actuator command in response to the aircraft converting between the vertical takeoff and landing flight mode and the forward flight mode; and
- a proprotor system in data communication with the flight control computer, the proprotor system comprising:
- a duct;
- a plurality of proprotor blades surrounded by the duct, each of the proprotor blades including an active blade tip movable into a plurality of positions including a retracted position and an extended position; and
- one or more actuators coupled to the active blade tips;
- wherein, the tip gap monitoring system is configured to monitor a tip gap between the proprotor blades and the duct; and
- wherein, the one or more actuators are configured to move the active blade tips between the retracted position and the extended position based on the blade tip actuator command, thereby controlling the tip gap between the proprotor blades and the duct.

2. The tip gap monitoring and control system as recited in claim 1 wherein the blade tip actuator command further comprises a tip gap adjustment distance, the one or more actuators configured to move the active blade tips by the tip gap adjustment distance.

3. The tip gap monitoring and control system as recited in claim 1 wherein the blade tip actuator command further comprises one or more blade-specific blade tip actuator commands, each of the one or more blade-specific blade tip actuator commands corresponding to a respective one of the active blade tips.

4. The tip gap monitoring and control system as recited in claim 1 wherein each of the proprotor blades further comprises a main body having an open distal end, the active blade tips slidably coupled to the open distal ends of the main bodies of the proprotor blades; and
- wherein, the active blade tips are at least partially retracted into the main bodies of the proprotor blades in the retracted position and at least partially extended from the open distal ends of the main bodies of the proprotor blades in the extended position, thereby increasing the tip gap in the retracted position.

5. The tip gap monitoring and control system as recited in claim 1 wherein each of the proprotor blades further comprise a main body having a distal end, the active blade tips hingeably coupled to the distal ends of the main bodies of the proprotor blades; and
- wherein, the active blade tips are substantially coplanar with the main bodies of the proprotor blades in the extended position and form an angle of less than 180 degrees with the main bodies of the proprotor blades in the retracted position, thereby increasing the tip gap in the retracted position.

6. The tip gap monitoring and control system as recited in claim 1 wherein each proprotor blade further comprises a spring biasing a respective active blade tip in one of the retracted position or the extended position.

7. The tip gap monitoring and control system as recited in claim 1 wherein the active blade tips are independently actuated to permit nonuniform positioning of the active blade tips.

8. The tip gap monitoring and control system as recited in claim 1 wherein the proprotor system further comprises a proprotor hub, the one or more actuators disposed at the proprotor hub; and
- wherein, the one or more actuators are coupled to the active blade tips by a plurality of spanwise links.

9. The tip gap monitoring and control system as recited in claim 1 wherein the one or more actuators further comprise a plurality of actuators disposed at distal ends of the proprotor blades, each actuator coupled to a respective one of the active blade tips.

10. The tip gap monitoring and control system as recited in claim 1 wherein the one or more sensors are coupled to the proprotor system; and
- wherein, the one or more sensors include at least one of a strain gauge, an accelerometer or a distance sensor.

11. A rotorcraft having a vertical takeoff and landing flight mode and a forward flight mode, the rotorcraft comprising:
- a fuselage;
- a flight control computer comprising:
- a tip gap monitoring system including one or more sensors; and
- a blade length control module configured to generate a blade tip actuator command in response to the rotorcraft converting between the vertical takeoff and landing flight mode and the forward flight mode; and
- a proprotor system coupled to the fuselage and in data communication with the flight control computer, the proprotor system comprising:
- a duct;
- a plurality of proprotor blades surrounded by the duct, each of the proprotor blades including an active blade tip movable into a plurality of positions including a retracted position and an extended position; and
- one or more actuators coupled to the active blade tips;
- wherein, the tip gap monitoring system is configured to monitor a tip gap between the proprotor blades and the duct; and
- wherein, the one or more actuators are configured to move the active blade tips between the retracted position and the extended position based on the blade tip actuator command, thereby controlling the tip gap between the proprotor blades and the duct.

12. The rotorcraft as recited in claim 11 further comprising a maneuver detection module configured to detect a flight condition of the rotorcraft, the blade length control module configured to determine the blade tip actuator command based on the flight condition;
- wherein, the flight condition further comprises at least one of a flight maneuver or a flight mode.

13. A method for controlling a tip gap for a ducted aircraft having a vertical takeoff and landing flight mode and a forward flight mode, the method comprising:
- monitoring a tip gap between a duct and a plurality of proprotor blades using one or more sensors;
- generating a blade tip actuator command in response to the ducted aircraft converting between the vertical takeoff and landing flight mode and the forward flight mode;

transmitting the blade tip actuator command to a proprotor system including the duct and the proprotor blades, the proprotor blades including active blade tips; and moving at least one of the active blade tips between a retracted position and an extended position in response to the blade tip actuator command, thereby controlling the tip gap between the proprotor blades and the duct.

14. The method as recited in claim 13 further comprising generating the blade tip actuator command in response to receiving a tip gap adjustment distance.

15. The method as recited in claim 14 further comprising generating the blade tip actuator command in response to the tip gap adjustment distance exceeding a tip gap adjustment distance threshold.

16. The method as recited in claim 13 further comprising generating the blade tip actuator command based on a pitch of the proprotor blades.

17. The method as recited in claim 13 further comprising retracting the active blade tips in response to detecting a structural deformity of the proprotor system.

18. The method as recited in claim 13 further comprising retracting the active blade tips in response to detecting a collision with the proprotor system.

19. The method as recited in claim 13 further comprising moving the active blade tips such that the tip gap is substantially equal to a tip gap target.

20. The method as recited in claim 13 further comprising:
moving at least one of the active blade tips to form a vertical takeoff and landing flight mode tip gap between the proprotor blades and the duct in response to the ducted aircraft converting to the vertical takeoff and landing flight mode; and
moving at least one of the active blade tips to form a forward flight mode tip gap between the proprotor blades and the duct in response to the ducted aircraft converting to the forward flight mode, the forward flight mode tip gap different from the vertical takeoff and landing flight mode tip gap.

* * * * *